(12) United States Patent
Peng et al.

(10) Patent No.: US 12,418,468 B2
(45) Date of Patent: Sep. 16, 2025

(54) SLA PERFORMANCE PREDICTION METHOD AND RELATED APPARATUS, AND DEVICE

(71) Applicant: HUAWEI TECHNOLOGIES CO., LTD., Guangdong (CN)

(72) Inventors: Xi Peng, Hong Kong (CN); Li Chen, Shenzhen (CN); Gong Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/347,269

(22) Filed: Jul. 5, 2023

(65) Prior Publication Data

US 2023/0344740 A1 Oct. 26, 2023

Related U.S. Application Data

(63) Continuation of application No. PCT/CN2021/141361, filed on Dec. 24, 2021.

(30) Foreign Application Priority Data

Jan. 6, 2021 (CN) .......................... 202110015229.2

(51) Int. Cl.
*H04L 43/106* (2022.01)
*H04L 41/5003* (2022.01)
*H04L 43/067* (2022.01)

(52) U.S. Cl.
CPC ........ *H04L 43/106* (2013.01); *H04L 41/5003* (2013.01); *H04L 43/067* (2013.01)

(58) Field of Classification Search
CPC ... H04L 41/142; H04L 41/145; H04L 41/147; H04L 41/16; H04L 41/5003;
(Continued)

(56) References Cited

U.S. PATENT DOCUMENTS 10,929,530 B1 * 2/2021 Puche Rondon ..... G06F 21/552
2013/0007259 A1 * 1/2013 Pacheco-Sanchez .......................
G06F 11/3452
709/224

(Continued)

OTHER PUBLICATIONS

Cicotti, Giuseppe, et al. "Runtime Model Checking for SLA Compliance Monitoring and QoS Prediction." J. Wirel. Mob. Networks Ubiquitous Comput. Dependable Appl. 6.2: 4-20. (Year: 2015).*

(Continued)

*Primary Examiner* — John M Macilwinen
(74) *Attorney, Agent, or Firm* — Fish & Richardson P.C.

(57) ABSTRACT

The present disclosure relates to service level agreement (SLA) performance prediction methods, apparatuses, and devices. In one example method, a first network device obtains timestamps and packet lengths of a plurality of data packets. The first network device determines an arrival time interval of each of the plurality of data packets based on the timestamps of the plurality of data packets, where arrival time intervals of the plurality of data packets constitute a time interval sequence according to an arrival order. The first network device determines time domain feature parameters of the plurality of data packets based on a Markovian arrival process (MAP) model and the time interval sequence.

19 Claims, 15 Drawing Sheets

(58) Field of Classification Search
CPC . H04L 41/5009; H04L 43/067; H04L 43/106; H04L 47/2425; H04L 47/28; H04L 47/56; H04L 47/83
See application file for complete search history.

(56) References Cited

U.S. PATENT DOCUMENTS

2020/0187023 A1* 6/2020 Hwang .................. H04W 24/02
2020/0382402 A1* 12/2020 Kolar ..................... H04L 43/20

OTHER PUBLICATIONS

Muscariello, Luca, et al. "Markov models of internet traffic and a new hierarchical MMPP model." Computer communications 28.16 : 1835-1851. (Year: 2005).*

Klemm, Alexander, Christoph Lindemann, and Marco Lohmann. "Modeling IP traffic using the batch Markovian arrival process." Performance Evaluation 54.2: 149-173. (Year: 2003).*

Zhao, Ji-An, et al. "Analysis of priority based scheduling of real-time video over 3G wireless network." 5th IEEE International Conference on High Speed Networks and Multimedia Communication (Cat. No. 02EX612). IEEE. (Year: 2002).*

Walayat et al., "Analysing Cloud QoS Prediction Approaches and Its Control Parameters: Considering Overall Accuracy and Freshness of a Dataset," IEEE Access, vol. 7, Jun. 19, 2019, pp. 82649-82671.

Cisco, "Cisco 2020 Global Network Trends Report," Nov. 17, 2019, 244 pages (with English translation).

Huawei iLab, "Huawei iLab Cloud VR Technology White Paper," 2018, 58 pages.

Extended European Search Report in European Appln No. 21917297.0, dated Apr. 26, 2024, 10 pages.

* cited by examiner

SLA PERFORMANCE PREDICTION METHOD AND RELATED APPARATUS, AND DEVICE

CROSS-REFERENCE TO RELATED APPLICATIONS

This application is a continuation of International Application No. PCT/CN2021/141361, filed on Dec. 24, 2021, which claims priority to Chinese Patent Application No. 202110015229.2, filed on Jan. 6, 2021. The disclosures of the aforementioned applications are hereby incorporated by reference in their entireties.

TECHNICAL FIELD

The present invention relates to the field of communication technologies, and in particular, to an SLA performance prediction method and a related apparatus, and a device.

BACKGROUND

With development of 4K/8K high-definition videos and cloud virtual reality (cloud virtual reality, Cloud VR) and commercialization of 5G, providing SLA performance assurance for video service-centric data traffic becomes an important goal of internet service providers (Internet service provider, ISP). Accurate learning of traffic features is the basis of service level agreement (service-level agreement, SLA) performance prediction, helps ensure and improve user experience, and can provide guidance for network planning and resource allocation. An effective traffic feature learning and SLA prediction method and apparatus play an important role in evolution of a broadband metropolitan area network and a 5G network.

A rate of conventional voice service traffic is stable at different time scales, and the traffic complies with a Poisson model. However, a rate of video service-centric data traffic presents different properties at different time scales. The rate of the data traffic fluctuates slightly at a macro time scale, but bursts sharply at small time scales of milliseconds and microseconds. Therefore, a traffic feature of the data traffic does not comply with a classic Poisson model. A voice service-based traffic modeling method that is previously widely used in the industry is no longer suitable for describing a data traffic feature of a live network.

How to predict SLA performance of video service-centric data traffic is a technical issue that urgently needs to be addressed currently.

SUMMARY

Embodiments of this application provide an SLA performance prediction method and a related apparatus, and a device, to provide an SLA performance prediction method applicable to SLA performance prediction for a data stream including a video service or a service similar to a video service, and quickly calculate distribution of SLA performance.

According to a first aspect, an embodiment of this application provides an SLA performance prediction method, including:

A first network device obtains timestamps and packet lengths of a plurality of data packets;

the first network device determines an arrival time interval of each of the plurality of data packets based on the timestamps of the plurality of data packets, where arrival time intervals of the plurality of data packets constitute a time interval sequence according to an arrival order;

the first network device determines time domain feature parameters of the plurality of data packets based on a Markovian arrival process MAP model and the time interval sequence, where the time domain feature parameters are model parameters of the MAP model; and packet length feature parameters are determined based on the packet lengths of the plurality of data packets that have arrived, where the packet length feature parameters and the time domain feature parameters are used to predict SLA performance of the plurality of data packets.

In the foregoing method, an SLA performance prediction method applicable to SLA performance prediction for a data stream including a video service or a service similar to a video service is provided, and distribution of SLA performance can be quickly calculated to obtain an SLA performance prediction result.

In a possible implementation, a likelihood function of the time interval sequence is as follows:

$$L(D_0, D_1 \mid Z) = \varphi\left(\prod_{i=1}^{N-1} \exp(D_0 z_i) D_1\right) \exp(D_0 z_N)(D_1 \underline{1}); \text{ and}$$

$$\begin{cases} \varphi(D_0 + D_1) = 0 \\ \varphi \underline{1} = 1 \end{cases},$$

where $D_0$ and $D_1$ are the model parameters, Z is the time interval sequence, $Z=(z_1, z_2, \ldots, z_N)$, $z_i$ indicates an arrival time interval of an $(i+1)^{th}$ data packet that has arrived, $\underline{1}$ indicates an all-1 column vector, and the time domain feature parameters are model parameters obtained when the likelihood function is a maximum value.

In the foregoing method, a traffic feature parameter of data can be accurately learned.

In a possible implementation, the SLA performance includes a latency, and the method further includes:

The first network device sends, to a second network device, signaling that carries the time domain feature parameters and the packet length feature parameters, so that the second network device determines, based on the time domain feature parameters, the packet length feature parameters, and network bandwidth, a first cumulative probability value indicating a probability that latencies of the plurality of data packets are less than a target latency, where when the first cumulative probability value is greater than a first preset threshold, the latencies of the plurality of data packets meet an SLA requirement.

In a possible implementation, the SLA performance includes a latency, and the method further includes:

The first network device determines, based on the time domain feature parameters, the packet length feature parameters, and network bandwidth, a first cumulative probability value indicating a probability that latencies of the plurality of data packets are less than a target latency, where when the first cumulative probability value is greater than a first preset threshold, the latencies of the plurality of data packets meet an SLA requirement.

In a possible implementation, a cumulative probability distribution function of the latency T of the plurality of data packets is as follows:

$$F_T(x) = Pr[T \le x] = 1 - \frac{1}{\lambda_p} \sum_{l=0}^{\infty} \pi_l D_1 t_l(x),$$

where l is an integer, $\lambda_p = \varphi D_1 \underline{1}$, $\pi Q = \underline{0}$, $\pi = [\pi_0, \pi_1, \ldots, \pi_l, \ldots]$, and $\pi \underline{1} = 1$;

$$Q = \begin{bmatrix} D_0 & D_1 & O & O & \ldots \\ \mu_p I & D_0 - \mu_p I & D_1 & O & \ldots \\ O & \mu_p I & D_0 - \mu_p I & D_1 & \ldots \\ O & O & \mu_p I & D_0 - \mu_p I & \ldots \\ \vdots & \vdots & \vdots & \vdots & \vdots \end{bmatrix},$$

$\underline{0}$ indicates an all-0 row vector, I indicates a unit matrix, $\mu_p$ indicates a packet forwarding rate, $\mu_p = \mu/L$, L indicates the packet length feature parameters, and $\mu$ indicates the network bandwidth;

$t_l(x)$ indicates an auxiliary function, $t(x) = [t_0(x)^T, t_1(x)^T, \ldots, t_l(x)^T, \ldots]^T$, and $$\frac{d}{dx} t(x) = B \cdot t(x);$$

$$B = \begin{bmatrix} D_0 - \mu_p I & D_1 & O & O & \ldots \\ \mu_p I & D_0 - \mu_p I & D_1 & O & \ldots \\ O & \mu_p I & D_0 - \mu_p I & D_1 & \ldots \\ O & O & \mu_p I & D_0 - \mu_p I & \ldots \\ \vdots & \vdots & \vdots & \vdots & \vdots \end{bmatrix},$$

and O indicates an all-0 matrix; and the cumulative probability distribution function $F_T(x)$ is used to calculate the first cumulative probability value.

In the foregoing method, comprehensive distribution of latencies is provided, and a probability that the latency is not greater than any threshold can be calculated.

In a possible implementation, the method further includes:

The first network device generates a time interval sequence of a plurality of simulated data packets based on the MAP model and the time domain feature parameters;

the first network device generates a packet length sequence of the plurality of simulated data packets based on the packet length feature parameters;

the first network device obtains a timestamp and a packet length of each of the plurality of simulated data packets based on the time interval sequence of the plurality of simulated data packets and the packet length sequence of the plurality of simulated data packets; and the first network device performs an SLA performance test on the plurality of simulated data packets based on timestamps and packet lengths of the plurality of simulated data packets, where an SLA performance test result of the plurality of simulated data packets is an SLA performance prediction result of the plurality of data packets.

In the foregoing method, a simulated data stream is generated based on a time domain feature parameter and a packet length feature parameter that are learned, and SLA performance of the simulated data stream is tested to represent SLA performance of a raw data stream, namely, the plurality of data packets, so that prediction accuracy is high.

In a possible implementation, that the first network device obtains a timestamp and a packet length of each of the plurality of simulated data packets based on the time interval sequence of the plurality of simulated data packets and the packet length sequence of the plurality of simulated data packets specifically includes:

The first network device determines that a timestamp of a $(j+1)^{th}$ simulated data packet is a cumulative value of first j time intervals in the time interval sequence of the plurality of simulated data packets, where j is a positive integer not greater than a total quantity of the plurality of simulated data packets; and the first network device determines that a packet length of a $j^{th}$ simulated data packet is a $j^{th}$ packet length in the packet length sequence of the plurality of simulated data packets.

In a possible implementation, that the first network device performs an SLA performance test on the plurality of simulated data packets based on timestamps and packet lengths of the plurality of simulated data packets includes:

The first network device determines, based on the timestamps and the packet lengths of the plurality of simulated data packets, a first cumulative probability value indicating a probability that latencies of the plurality of simulated data packets are less than a target latency, where when the first cumulative probability value is greater than a first preset threshold, latencies of the plurality of data packets meet an SLA requirement.

In a possible implementation, the method further includes:

The first network device controls network planning when the first cumulative probability value is less than the first preset threshold.

In a possible implementation, the SLA performance includes a cache queue length, and the method further includes:

The first network device determines, based on the time domain feature parameters, the packet length feature parameters, and the network bandwidth, a second cumulative probability value indicating a probability that cache queue lengths of the plurality of data packets are less than a target length, where when the second cumulative probability value is greater than a second preset threshold, the cache queue lengths of the plurality of data packets meet an SLA requirement.

In a possible implementation, a cumulative probability distribution function $F_A(y)$ of the cache queue length A is as follows:

$F_A(y) = Pr[A \le y] = \sum_{l=0}^{y} \pi_l$, where l is an integer, $\pi Q = \underline{0}$, $\pi = [\pi_0, \pi_1, \ldots, \pi_l, \ldots]$, and $\pi \underline{1} = 1$;

$$Q = \begin{bmatrix} D_0 & D_1 & O & O & \ldots \\ \mu_p I & D_0 - \mu_p I & D_1 & O & \ldots \\ O & \mu_p I & D_0 - \mu_p I & D_1 & \ldots \\ O & O & \mu_p I & D_0 - \mu_p I & \ldots \\ \vdots & \vdots & \vdots & \vdots & \vdots \end{bmatrix},$$

$\underline{0}$ indicates an all-0 row vector, I indicates a unit matrix, $\mu_p$ indicates a packet forwarding rate, $\mu_p = \mu/L$, L indicates the packet length feature parameters, and $\mu$ indicates the network bandwidth; and $F_A(y)$ is used to calculate the second cumulative probability value.

In the foregoing method, comprehensive distribution of cache queue lengths is provided, and a probability that the cache queue length is not greater than any threshold can be calculated.

In a possible implementation, the plurality of data packets are in one of the following cases:

data packets of user equipment that are specific to a target service;

data packets received from a plurality of user equipments; or data packets that are specific to a target service and that are received from a plurality of user equipments.

According to a second aspect, an embodiment of this application further provides a service level agreement SLA performance prediction method. The method includes:

A second network device receives data streams from K first network devices respectively, to obtain a raw data stream, where K is a positive integer;

the second network device receives time domain feature parameters and packet length feature parameters from the K first network devices respectively, where the time domain feature parameter of the first network device is determined by the first network device based on a Markovian arrival process MAP model and a time interval sequence, the time domain feature parameter of the first network device is a model parameter of the MAP model, the time interval sequence includes arrival time intervals, arranged according to an arrival order, of a plurality of data packets sent by the first network device, and the packet length feature parameter of the first network device is determined based on packet lengths of the plurality of the data packets; and the second network device predicts SLA performance of the raw data stream based on a time domain feature parameter of the raw data stream and a packet length feature parameter of the raw data stream, where the time domain feature parameter of the raw data stream is determined based on the time domain feature parameters received by the second network device, and the packet length feature parameter of the raw data stream is determined based on the packet length feature parameters received by the second network device.

In the foregoing method, an SLA performance prediction method applicable to SLA performance prediction for a data stream including a video service or a service similar to a video service is provided, and distribution of SLA performance can be quickly calculated to obtain an SLA performance prediction result.

In a possible implementation, K=1, the time domain feature parameter of the raw data stream is the time domain feature parameter of the first network device, and the packet length feature parameter of the raw data stream is the packet length feature parameter of the first network device.

In a possible implementation, K is greater than 1, the time domain feature parameter of the raw data stream is a Kronecker sum of the received time domain feature parameters, and the packet length feature parameter of the raw data stream is a largest packet length feature parameter of the received packet length feature parameters.

In the foregoing method, distributed learning is performed, so that computing pressure of the second network device can be alleviated, and computing efficiency is improved.

In a possible implementation, a likelihood function $L(D_0, D_1|Z)$ of the time interval sequence is as follows:

$$L(D_0, D_1 | Z) = \varphi\left(\prod_{i=1}^{N-1} \exp(D_0 z_i)D_1\right)\exp(D_0 z_N)(D_1\underline{1}); \text{ and}$$

$$\begin{cases} \varphi(D_0 + D_1) = 0 \\ \varphi\underline{1} = 1 \end{cases},$$

where $D_1$ and $D_1$ are the model parameters, Z is the time interval sequence, $Z=(z_1, z_2, \ldots, z_N)$, $z_i$ indicates an arrival time interval of an $(i+1)^{th}$ data packet that has arrived, $\underline{1}$ indicates an all-1 column vector, and the time domain feature parameters are model parameters obtained when the likelihood function is a maximum value.

In a possible implementation, the SLA performance includes a latency, and that the second network device predicts SLA performance of the raw data stream based on a time domain feature parameter of the raw data stream and a packet length feature parameter of the raw data stream includes:

The second network device determines, based on the time domain feature parameter of the raw data stream, the packet length feature parameter of the raw data stream, and network bandwidth, a first cumulative probability value indicating a probability that a latency of the raw data stream is less than a target latency, where when the first cumulative probability value is greater than a first preset threshold, latencies of the plurality of data packets meet an SLA requirement.

In a possible implementation, a cumulative probability distribution function of the latency T of the raw data stream is as follows:

$$F_T(x) = Pr[T \le x] = 1 - \frac{1}{\lambda_p}\sum_{l=0}^{\infty}\pi_l D_1 t_l(x),$$

where l is an integer, $\lambda_p=\varphi D_1\underline{1}$, $\pi Q=\underline{0}$, $\pi=[\pi_0, \pi_1, \ldots, \pi_l, \ldots]$, and $\pi\underline{1}=1$;

$$Q = \begin{bmatrix} D_0 & D_1 & O & O & \ldots \\ \mu_p I & D_0 - \mu_p I & D_1 & O & \ldots \\ O & \mu_p I & D_0 - \mu_p I & D_1 & \ldots \\ O & O & \mu_p I & D_0 - \mu_p I & \ldots \\ \vdots & \vdots & \vdots & \vdots & \vdots \end{bmatrix},$$

0 indicates an all-0 row vector, I indicates a unit matrix, $\mu_p$ indicates a packet forwarding rate, $\mu_p=\mu/L$, L indicates the packet length feature parameter of the raw data stream, and $\mu$ indicates the network bandwidth;

$t_l(x)$ indicates an auxiliary function, $t(x)=[t_0(x)^T, t_1(x)^T, \ldots, t_l(x)^T, \ldots]^T$, and $$\frac{d}{dx}t(x) = B \cdot t(x);$$

$$B = \begin{bmatrix} D_0 - \mu_p I & D_1 & O & O & \ldots \\ \mu_p I & D_0 - \mu_p I & D_1 & O & \ldots \\ O & \mu_p I & D_0 - \mu_p I & D_1 & \ldots \\ O & O & \mu_p I & D_0 - \mu_p I & \ldots \\ \vdots & \vdots & \vdots & \vdots & \vdots \end{bmatrix},$$

and 0 indicates an all-0 matrix; and the cumulative probability distribution function $F_T(x)$ is used to calculate the first cumulative probability value.

In a possible implementation, that the second network device predicts SLA performance of the raw data stream based on a time domain feature parameter of the raw data stream and a packet length feature parameter of the raw data stream includes:

The second network device generates a time interval sequence of a plurality of simulated data packets based on the MAP model and the time domain feature parameter of the first network device;

the second network device generates a packet length sequence of the plurality of simulated data packets based on the packet length feature parameter of the first network device;

the second network device obtains a timestamp and a packet length of each of the plurality of simulated data packets based on the time interval sequence of the plurality of simulated data packets and the packet length sequence of the plurality of simulated data packets; and the second network device performs an SLA performance test on the plurality of simulated data packets based on timestamps and packet lengths of the plurality of simulated data packets, where an SLA performance test result of the plurality of simulated data packets is an SLA performance prediction result of the raw data stream.

In a possible implementation, that the second network device obtains a timestamp and a packet length of each of the plurality of simulated data packets based on the time interval sequence of the plurality of simulated data packets and the packet length sequence of the plurality of simulated data packets specifically includes:

The second network device determines that a timestamp of a $(j+1)^{th}$ simulated data packet is a cumulative value of first j time intervals in the time interval sequence of the plurality of simulated data packets, where j is a positive integer not greater than a total quantity of the plurality of simulated data packets; and the second network device determines that a packet length of a $j^{th}$ simulated data packet is a $j^{th}$ packet length in the packet length sequence of the plurality of simulated data packets.

In a possible implementation, that the second network device performs an SLA performance test on the plurality of simulated data packets based on timestamps and packet lengths of the plurality of simulated data packets includes:

The second network device determines, based on the timestamps and the packet lengths of the plurality of simulated data packets, a first cumulative probability value indicating a probability that latencies of the plurality of simulated data packets are less than a target latency, where when the first cumulative probability value is greater than a first preset threshold, latencies of the plurality of data packets meet an SLA requirement.

In a possible implementation, the method further includes:

The second network device controls network planning when the first cumulative probability value is less than the first preset threshold.

In a possible implementation, the SLA performance includes a cache queue length, and the method further includes:

The second network device determines, based on the time domain feature parameter of the raw data stream, the packet length feature parameter of the raw data stream, and the network bandwidth, a second cumulative probability value indicating a probability that a cache queue length of the raw data stream is less than a target length, where when the second cumulative probability value is greater than a second preset threshold, the cache queue length of the raw data stream meets an SLA requirement.

In a possible implementation, a cumulative probability distribution function $F_A(y)$ of the cache queue length A is as follows:

$F_A(y)=Pr[A \leq y]=\Sigma_{l=0}^{y}\pi_l$, where l is an integer, $\pi Q=\underline{0}$, $\pi=[\pi_0, \pi_1, \ldots, \pi_l, \ldots]$, and $\pi\underline{1}=1$;

$$Q = \begin{bmatrix} D_0 & D_1 & 0 & 0 & \ldots \\ \mu_p I & D_0-\mu_p I & D_1 & 0 & \ldots \\ 0 & \mu_p I & D_0-\mu_p I & D_1 & \ldots \\ 0 & 0 & \mu_p I & D_0-\mu_p I & \ldots \\ \vdots & \vdots & \vdots & \vdots & \vdots \end{bmatrix},$$

$\underline{0}$ indicates an all-0 row vector, I indicates a unit matrix, $\mu_p$ indicates a packet forwarding rate, $\mu_p=\mu/L$, L indicates the packet length feature parameter of the raw data stream, and $\mu$ indicates the network bandwidth; and $F_A(y)$ is used to calculate the second cumulative probability value.

In a possible implementation, the raw data stream is in one of the following cases:

data packets sent by the K first network devices for a target service; or data packets sent by the K first network devices.

According to a third aspect, an embodiment of this application further provides an SLA performance prediction apparatus. The apparatus may include functional units for implementing the method according to any one of the first aspect or the implementations of the first aspect.

According to a fourth aspect, an embodiment of this application further provides an SLA performance prediction apparatus. The apparatus may include functional units for implementing the method according to any one of the second aspect or the implementations of the second aspect.

According to a fifth aspect, an embodiment of this application further provides an electronic device, including one or more processors, one or more memories, and a communication interface. The one or more memories are coupled to the one or more processors. The one or more memories are configured to store computer program code. The computer program code includes computer instructions. When the one or more processors execute the computer instructions, the electronic device implements the method according to any one of the first aspect or the implementations of the first aspect.

According to a sixth aspect, an embodiment of this application further provides an electronic device, including one or more processors, one or more memories, and a communication interface. The one or more memories are coupled to the one or more processors. The one or more memories are configured to store computer program code. The computer program code includes computer instructions. When the one or more processors execute the computer instructions, the electronic device implements the method according to any one of the second aspect or the implementations of the second aspect.

According to a seventh aspect, an embodiment of this application further provides a computer-readable storage medium, including computer instructions. When the computer instructions run on an electronic device, the electronic device is enabled to perform the method according to any one of the first aspect or the implementations of the first aspect.

According to an eighth aspect, an embodiment of this application further provides a computer-readable storage medium, including computer instructions. When the computer instructions run on an electronic device, the electronic device is enabled to perform the method according to any one of the second aspect or the implementations of the second aspect.

DESCRIPTION OF EMBODIMENTS

Figure 1:
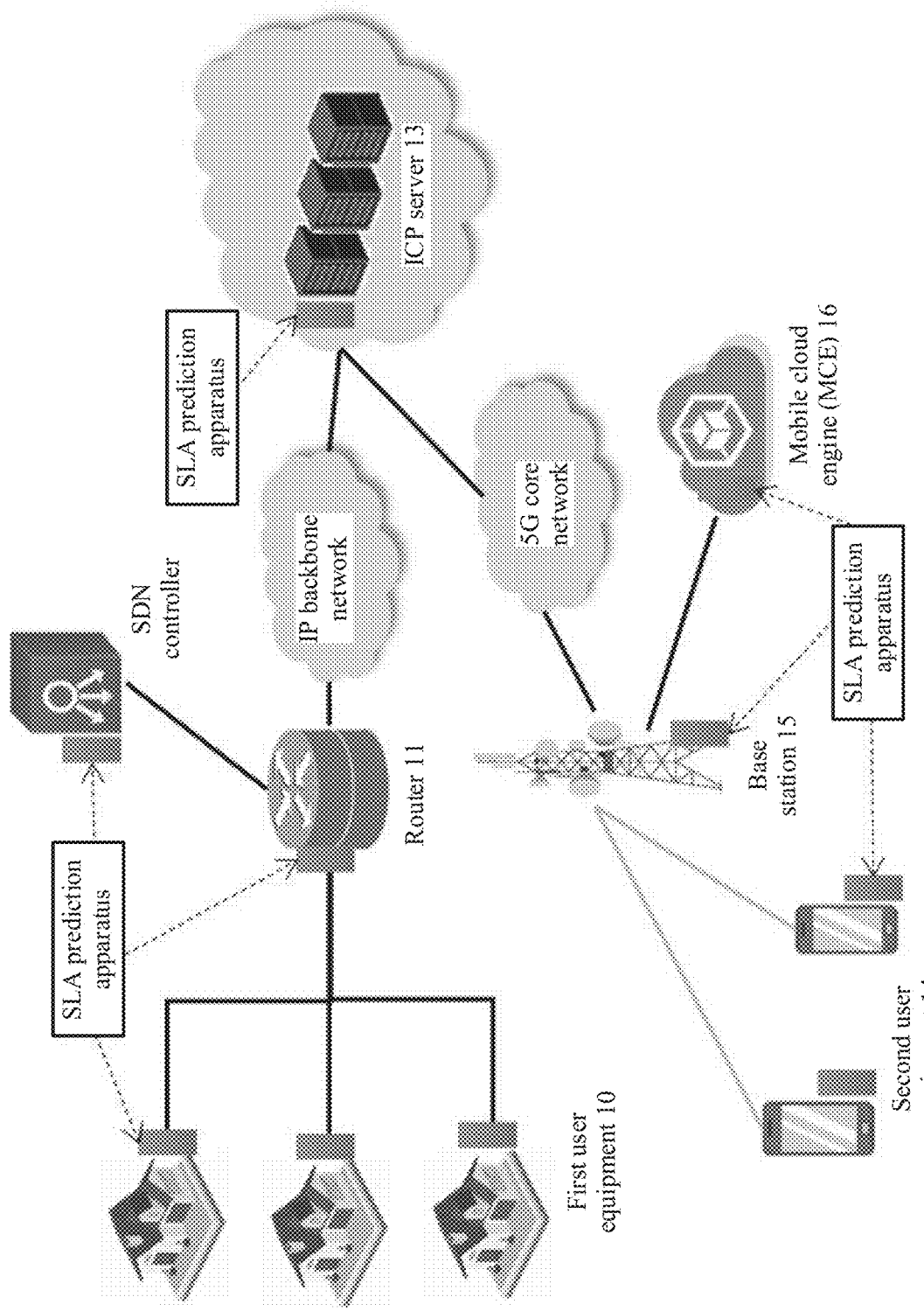
FIG. 1 is a schematic diagram of a system architecture according to an embodiment of this application.

Terms used in the following embodiments of this application are merely intended to describe specific embodiments, but not to limit embodiments of this application. The terms "one", "a", "the", "the foregoing", "this", and "the one" of singular forms used in this specification and the appended claims of embodiments of this application are also intended to include plural forms, unless otherwise specified in the context clearly. It should be further understood that the term "and/or" used in embodiments of this application indicates and includes any or all possible combinations of one or more listed items.

The following describes concepts in embodiments of this application.

(1) Service Level Agreement (Service Level Agreement, SLA)

In the field of communication technologies, an SLA is a formal commitment defined between a service provider and a customer, and may be a specific committed service indicator to be achieved between a service provider (for example, a fixed network service provider or a mobile network service provider) and a served user, between a content service provider and a network service provider, or the like. Usually, SLA performance is a committed service indicator of the SLA, and may include mean time between failures (Mean Time Between Failures, MTBF), mean time to repair (Mean time to repair, MTTR), a party responsible for reporting errors and paying fees, a throughput, jitter, a latency, a cache queue length, or another measurable indicator.

(2) Cloud Virtual Reality (Cloud Virtual Reality, Cloud VR)

In cloud VR, ideas and technologies of cloud computing and cloud rendering are introduced into VR service applications, and display output, audio output, and the like on a cloud are encoded and compressed and then transmitted to user equipment through a high-speed and stable network, to implement cloud-based content and rendering for a VR service. The cloud VR is similar to a video service.

(3) Markovian Arrival Process (Markovian Arrival Process, MAP)

A Markovian arrival process model, also referred to as a MAP model, is a statistical model for describing a Markovian arrival process. In this application, a data packet arrival time interval may be considered as complying with the Markovian arrival process. In this application, an unknown parameter, namely, a traffic feature, of the Markovian arrival process (or the MAP model) is determined based on an observable parameter, namely, the data packet arrival time interval, and then SLA performance is predicted by using the traffic feature. Herein, the unknown parameter may be obtained by using a maximum likelihood estimation method. It should be understood that, that a maximum value is obtained in a likelihood function indicates that a corresponding parameter can make the statistical model most appropriate.

In this application, a quantity of jobs in an FCFS queue (a queue length) is modeled, where the jobs arrive according to the Markovian arrival process, the jobs are served according to an arrival sequence, and the MAP is used to model a job arrival process.

(4) Software-defined Network (Software-Defined Network, SDN)

The SDN is an implementation of network virtualization, and is intended to separate a control plane and a data plane of a network device, to flexibly control data streams, make a network more intelligent as a pipe, and provide a good platform for innovation of a core network and an application.

A controller (also referred to as an SDN controller in this application) in the SDN implements a control plane function, and a forwarder implements a data plane function. Therefore, the controller and the forwarder in the SDN are separately defined and separately deployed.

In the SDN, the controller may exchange data with the forwarder according to a protocol such as the network configuration (network configuration, Netconf) protocol or the representational state transfer configuration (representational state transfer configuration, restconf) protocol. The controller and the forwarder each include a configuration file. The configuration file includes configuration data. The configuration data may include data for indicating a control plane to perform a control function or indicating a data plane to forward data. Therefore, configuration data between the controller and the forwarder needs to be consistent.

(5) Mobile Cloud Engine (Mobile Cloud Engine, MCE)

In a 5G architecture, the MCE is deployed as an entity for resource management and scheduling, and also loads and manages, through capability exposure and resource exposure management, an end-to-end slice capability required by future 5G. The MCE exchanges data with a base station through a convergence layer and an access layer.

The mobile cloud engine is a virtual machine optimized for a wireless capability, may run on a dedicated platform or a COTS universal platform, and is carried in a cloud OS and COTS cloud infrastructure. The mobile cloud engine has a carrier-class disaster recovery capability and features such as on-demand deployment, flexible capacity expansion, and independent feature upgrading of a native cloud architecture.

The following describes a system architecture in embodiments of this application with reference to FIG. 1. The system architecture 100 may include a fixed broadband (Fixed Broadband, FBB) network architecture and a mobile communication technology network architecture. The mobile communication network architecture may be a fifth-generation mobile communication technology (5th generation mobile network, 5G) network architecture.

As shown in FIG. 1, the FBB network architecture may include one or more first user equipments 10, a router 11, an SDN controller 12, an ICP server 13, and the like. The first user equipment 10 is a fixed broadband client. The router 11 is connected to the SDN controller 12, and is connected to the ICP server 13 through an IP backbone network. The router 11 is configured to forward a data packet from the one or more first user equipments 10 to the IP backbone network, and is configured to forward a data packet whose destination address is the first user equipment 10 to first user equipment 10 corresponding to the destination address.

A traffic feature learning apparatus may be deployed in the first user equipment 10, the router 11, the SDN controller 12, the ICP server 13, or the like. An SLA prediction apparatus may be deployed in the router 11, the SDN controller 12, or the ICP server 13. For example, the foregoing apparatus is deployed in a bypass manner to implement a function of the traffic feature learning apparatus or the SLA prediction apparatus. The first user equipment 10 may implement a function of the traffic feature learning apparatus by using an additional chip or loading software. For specific implementations of the traffic feature learning apparatus and the SLA prediction apparatus, refer to related descriptions of a traffic feature learning method in the following method embodiment shown in FIG. 4 and related descriptions of an SLA prediction apparatus shown in FIG. 10 and FIG. 11. Details are not described herein.

In some embodiments, in each running cycle, the traffic feature learning apparatus may locally extract a traffic feature parameter from a user, and the SLA prediction apparatus predicts SLA performance of each user based on allocated bandwidth, and if the SLA performance cannot meet an SLA requirement, initiates a warning to indicate the SDN controller to adjust bandwidth allocation in a timely manner.

In some embodiments, in each running cycle, a traffic feature learning apparatus is deployed in each first user equipment 10, each first user equipment 10 may send a learned traffic feature to the router, and the router 11 may calculate an aggregate traffic feature parameter, predict SLA performance of the router 11 based on bandwidth of the router 11, and if the SLA performance cannot meet an SLA requirement, initiate a warning to indicate the SDN controller to perform timely adjustment and planning.

The 5G network architecture may include one or more second user equipments 14, a base station 15, a mobile cloud engine (MCE) 16, an ICP server 13, and the like. The second user equipment 14 is a client of a mobile network. The base station 15 is connected to the mobile cloud engine (MCE) 16, and is connected to the ICP server 13 through a 5G core network. The base station 15 is configured to forward a data packet from the one or more second user equipments 14 to the core network, and is configured to forward a data packet whose destination address is the second user equipment 14 to second user equipment 14 corresponding to the destination address.

A traffic feature learning apparatus may be deployed in the second user equipment 14, the base station 15, the mobile cloud engine 16, the ICP server 13, or the like. An SLA prediction apparatus may be deployed in the base station 15, the mobile cloud engine 16, or the ICP server 13. For example, a function of the traffic feature learning apparatus or the SLA prediction apparatus is implemented in a bypass manner on the base station 15, the mobile cloud engine 16, or the ICP server 13, and the second user equipment 14 may implement a function of the traffic feature learning apparatus by using an additional chip or loading software. For specific implementations of the traffic feature learning apparatus and the SLA prediction apparatus, refer to related descriptions of a traffic feature learning method in the following method embodiment shown in FIG. 4 and related descriptions of an SLA prediction apparatus shown in FIG. 10 and FIG. 11. Details are not described herein.

In some embodiments, in each running cycle, the traffic feature learning apparatus may locally extract a traffic feature parameter from the second user equipment 14, and the SLA prediction apparatus predicts SLA performance of each user based on allocated bandwidth, and if the SLA performance cannot meet an SLA requirement, initiates a warning to indicate the MCE to adjust bandwidth allocation in a timely manner.

In some embodiments, in each running cycle, a traffic feature learning apparatus is deployed in each second user equipment 14, and the base station 15 may calculate an aggregate traffic feature parameter, predict SLA performance of the base station 15 based on bandwidth of the base station 15, and if the SLA performance cannot meet an SLA requirement, initiate a warning to indicate the mobile cloud engine 16 to perform timely adjustment and planning.

In some embodiments, the traffic feature learning apparatus may be implemented by using a distributed computing system. The distributed computing system may include a plurality of computing nodes, and the computing nodes cooperate with each other to implement traffic feature learning. In this implementation, an amount of computation can be dispersed, and traffic feature learning efficiency and real-time performance of SLA performance prediction are improved.

It should be understood that both the traffic feature learning apparatus and the SLA prediction apparatus may be deployed in the ICP server, to monitor transmission traffic of a content service provider and predict SLA performance.

It should be further understood that the first user equipment 10 may be a device connected to a fixed network, and may be a mobile phone, a personal computer, a tablet computer, a smart home device, a VR device, an AR device, or the like that performs communication through the fixed network; the second user equipment 14 may be a device connected to a mobile communication network, for example, a mobile phone, or a personal computer, a tablet computer, a smartwatch, a VR device, an AR device, or the like that can be connected to the mobile communication network; and the ICP server 13 may be a server of a video service provider. The video service provider may be a video content provider such as "Tencent Video", "iQIYI", "YouTube", or "TikTok". This is not limited herein.

In addition to the network devices in the system in FIG. 1, the system may further include another network device. The traffic feature learning apparatus or the SLA prediction apparatus may alternatively be deployed in the another network device.

It should be further noted that an SLA performance prediction method provided in embodiments of this application may alternatively be applied to a 4G network. In this case, the MEC may be replaced with a network resource management and scheduling entity.

Figure 2:
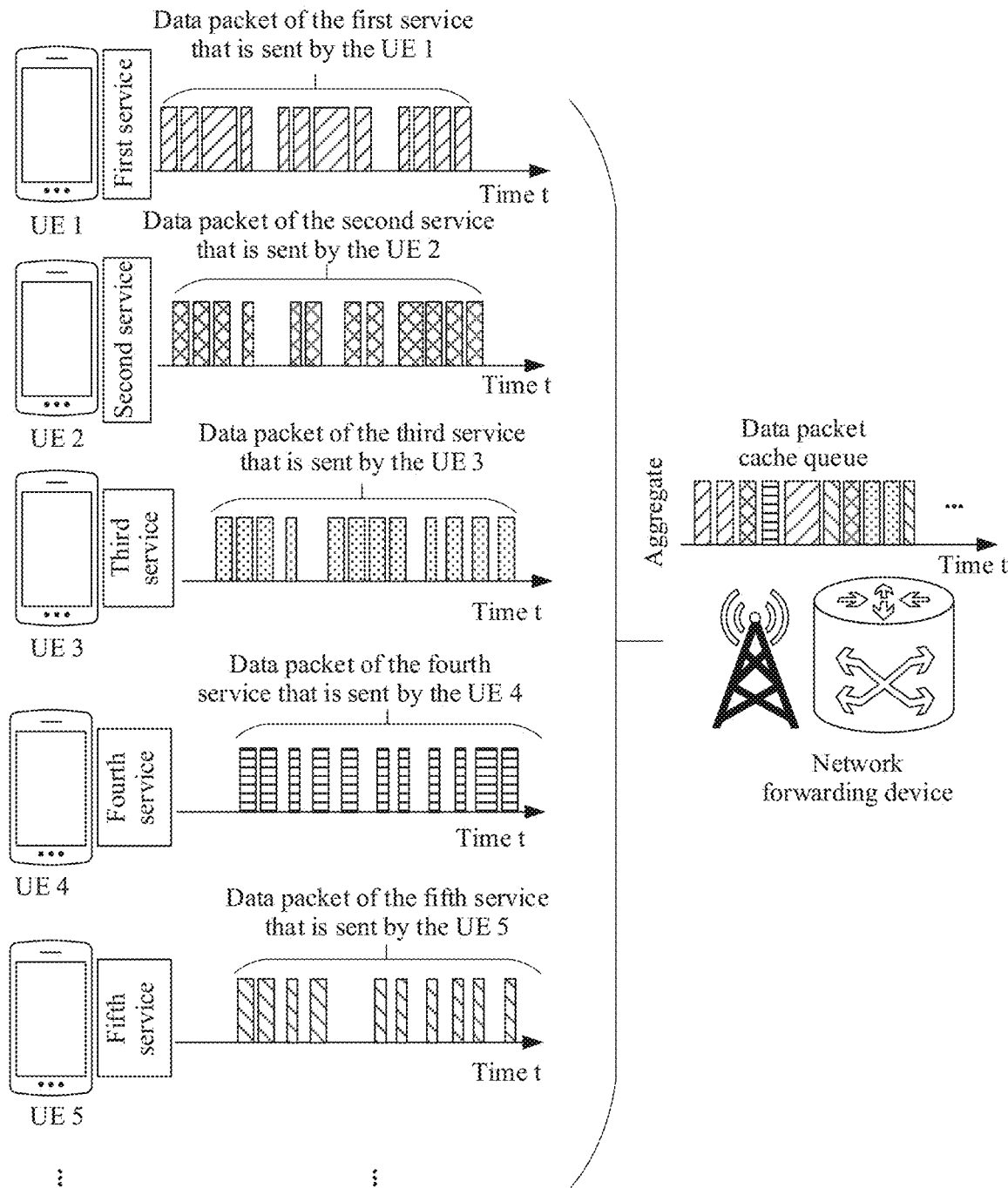
FIG. 2 is a schematic diagram of an application scenario according to an embodiment of this application.

FIG. 2 is a schematic diagram of an application scenario according to an embodiment of this application. A network forwarding device (for example, the router 11 or the base station 15 in FIG. 1) has a specific cache capacity and specific forwarding bandwidth, and a main function is to forward a data packet that arrives randomly (also referred to as a data packet). Data packets that have arrived may come from different users and services. As shown in FIG. 2, the data packets come from different user equipments: UE 1, UE 2, UE 3, UE 4, UE 5, and the like. The user equipments may have different traffic modes. For example, the UE 1 uses a first service, and sends a data packet of the first service to the network forwarding device, the UE 2 uses a second service, and sends a data packet of the second service to the network forwarding device, and so on. These data streams are arranged into a queue according to arrival time and share one network forwarding device. The network forwarding device forwards data packets according to a first in first out (first in first out, FIFO) rule. Queuing may occur in a cache, and a latency is caused by queuing. A queue length and the latency are key SLA performance indicators of a system. After a user purchases a service, an operator needs to meet a specific SLA requirement. If actual SLA performance cannot meet the SLA requirement, a controller (for example, an SDN controller or an MCE) needs to be indicated in a timely manner to adjust network bandwidth allocation.

Figure 3:
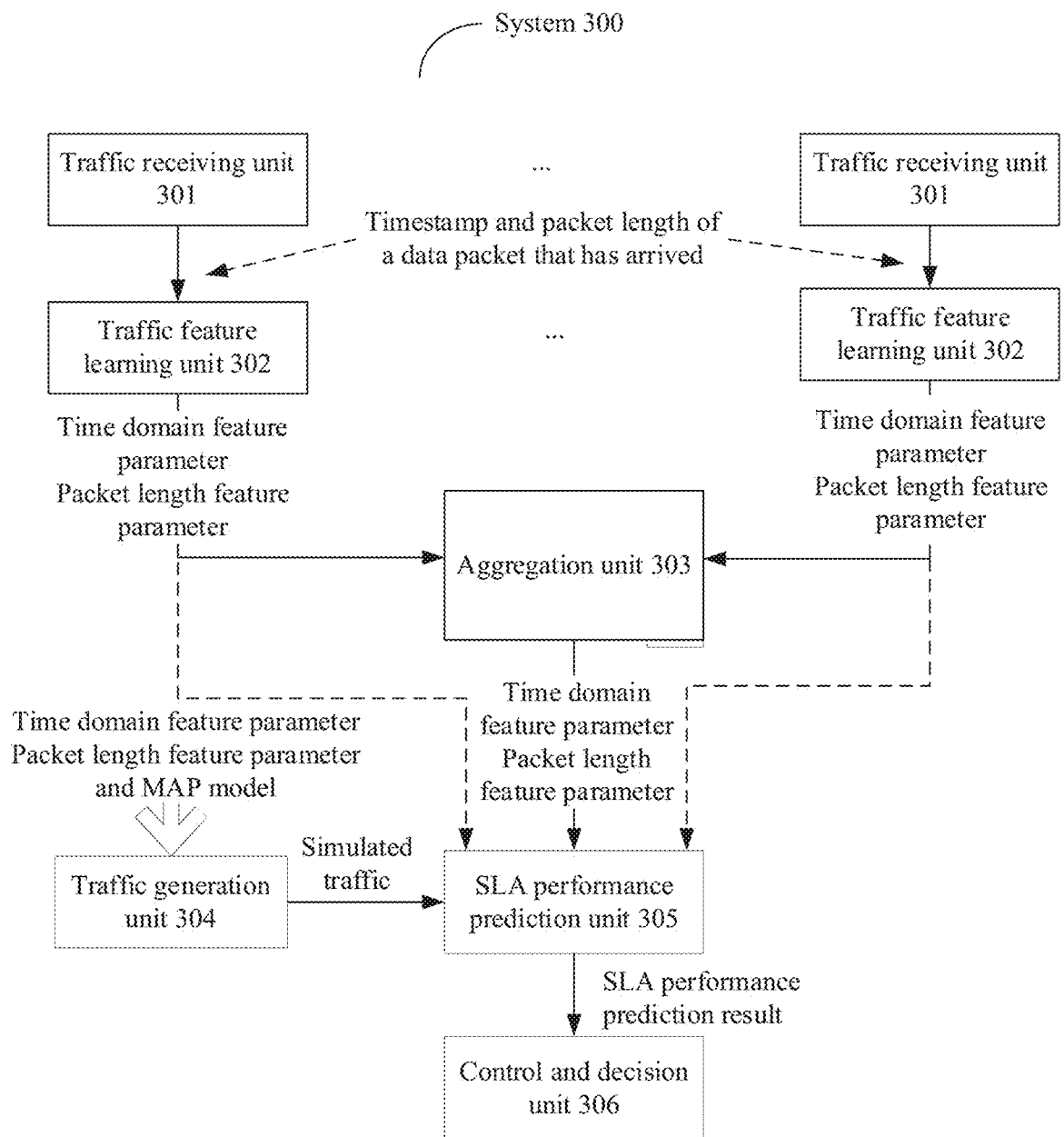
FIG. 3 is a schematic diagram of another system architecture according to an embodiment of this application.

The following describes another system architecture in embodiments of this application with reference to FIG. 3.

As shown in FIG. 3, the system 300 includes some or all of one or more traffic receiving units 301, a traffic feature learning unit 302 in a one-to-one correspondence with the traffic receiving unit 301, an aggregation unit 303, a traffic generation unit 304, an SLA performance prediction unit 305, a control and decision unit 306, and the like. In this embodiment of this application, N traffic receiving units 301 are used as an example for description, where N is a positive integer greater than 1. The units are described below.

The traffic receiving unit 301 is configured to obtain timestamps and packet lengths of a plurality of data packets.

The traffic feature learning unit 302 is configured to: determine an arrival time interval of each of the plurality of data packets based on the timestamps of the plurality of data packets, where arrival time intervals of the plurality of data packets constitute a time interval sequence according to an arrival order; further, determine time domain feature parameters of the plurality of data packets based on a Markovian arrival process MAP model through maximum likelihood estimation of the time interval sequence, where the time domain feature parameters are a state transition rate matrix of the MAP model; and determine packet length feature parameters based on the packet lengths of the plurality of the data packets.

The aggregation unit 303 is configured to aggregate traffic feature parameters, such as time domain feature parameters and packet length feature parameters, that are learned by a plurality of traffic feature learning units 302.

The traffic generation unit 304 is configured to generate information of a simulated data stream based on the MAP model, the time domain feature parameters, and the packet length feature parameters, where the information of the simulated data stream includes arrival time intervals and packet lengths of a plurality of simulated data packets.

The SLA performance prediction unit 305 is configured to predict SLA performance, such as a latency, based on the traffic feature parameters such as the time domain feature parameters and the packet length feature parameters. In a specific implementation, the SLA performance prediction unit 305 is configured to determine, based on the time domain feature parameters and the packet length feature parameters, a cumulative probability value indicating a probability that latencies of the plurality of data packets are less than a target latency. When the cumulative probability value is greater than a preset threshold, the latencies of the plurality of data packets meet an SLA requirement; or when the cumulative probability value is less than or equal to the preset threshold, the requirement is not met. In another implementation, the SLA performance prediction unit 305 performs an SLA performance test on the simulated data stream generated by the traffic generation unit 304, to obtain an SLA performance prediction result.

The control and decision unit 306 is configured to control network planning based on the SLA performance prediction result.

Figure 4:
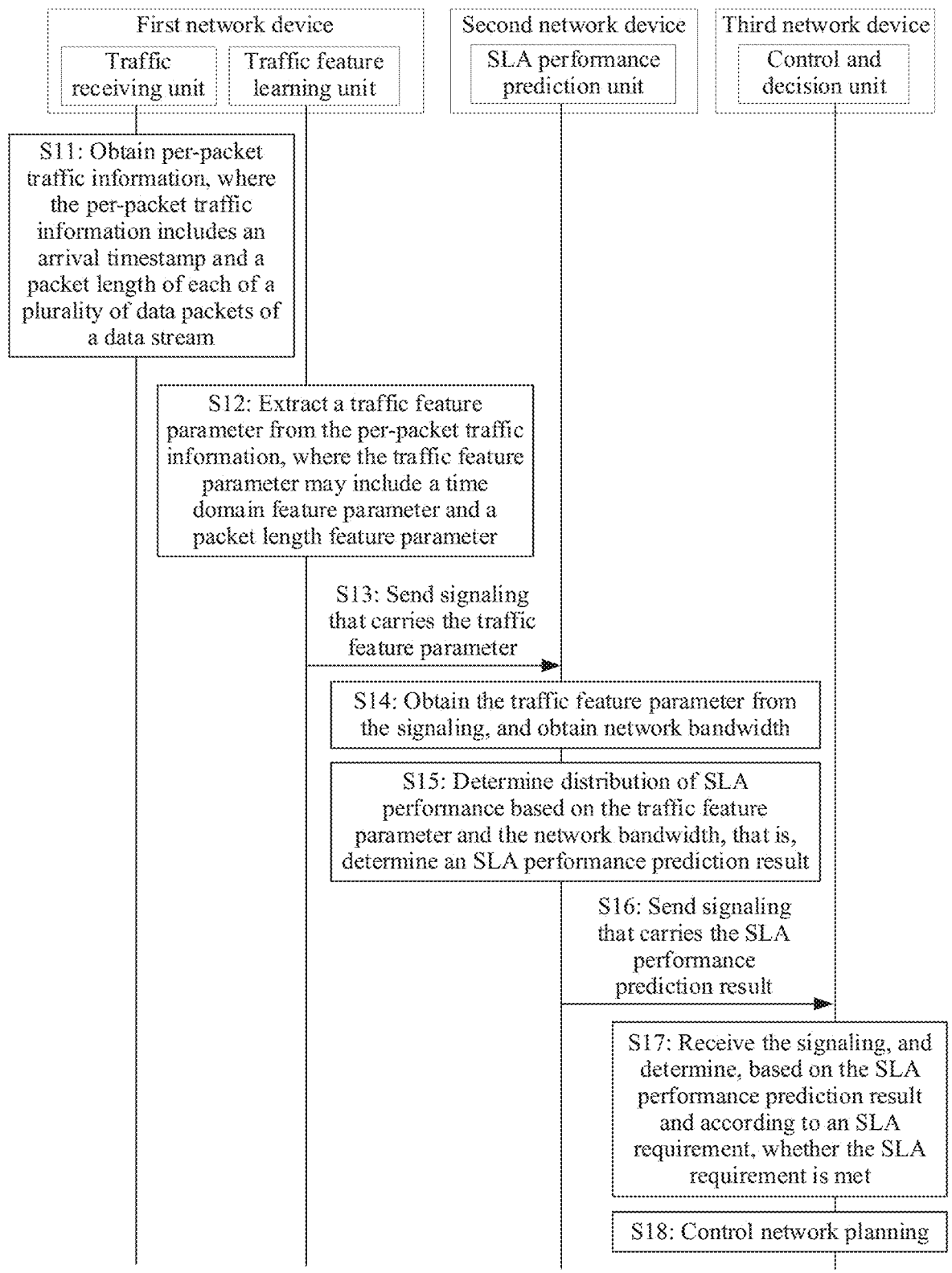
FIG. 4 is a schematic flowchart of an SLA performance prediction method according to an embodiment of this application.
Figure 6:
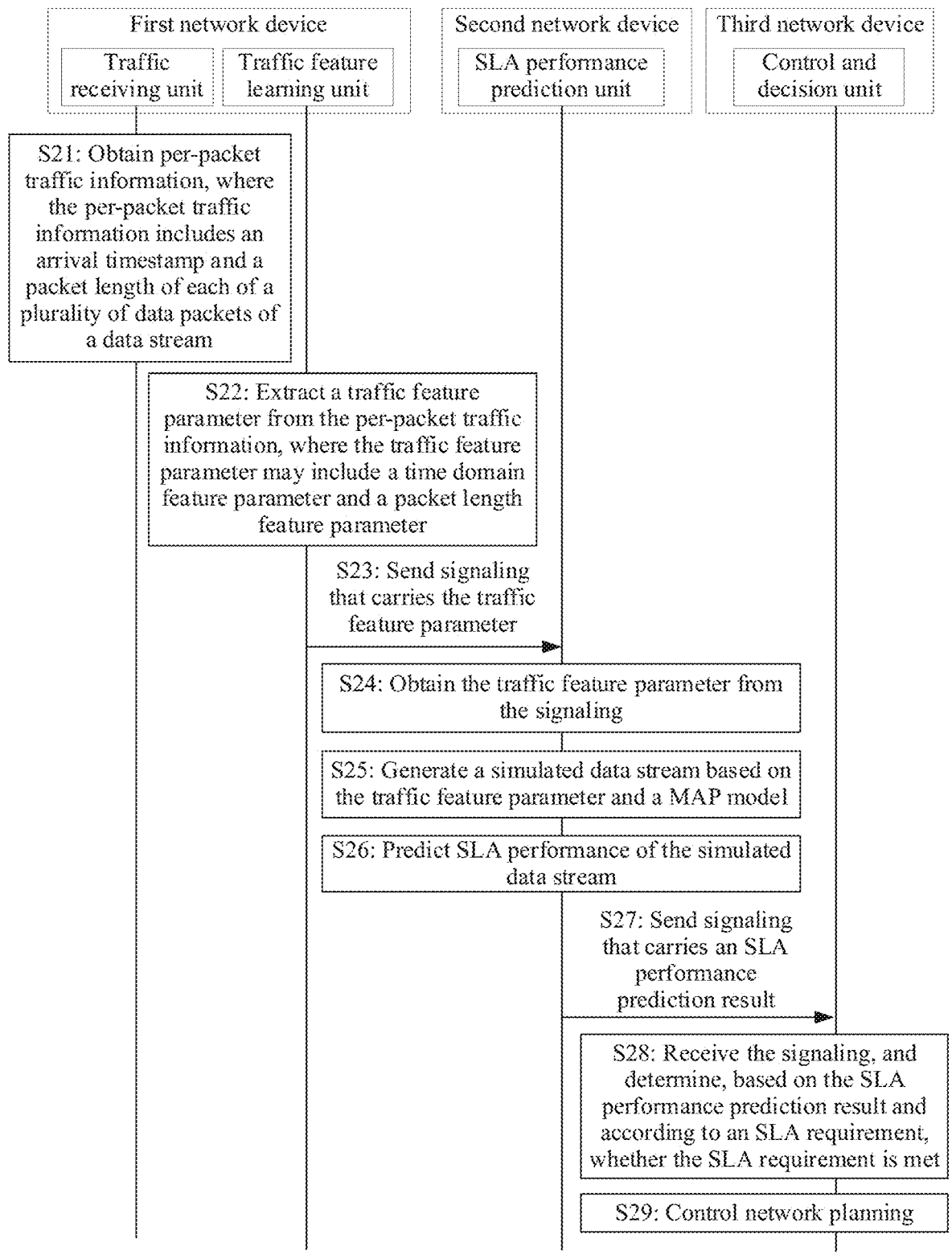
FIG. 6 is a schematic flowchart of another SLA performance prediction method according to an embodiment of this application.
Figure 8:
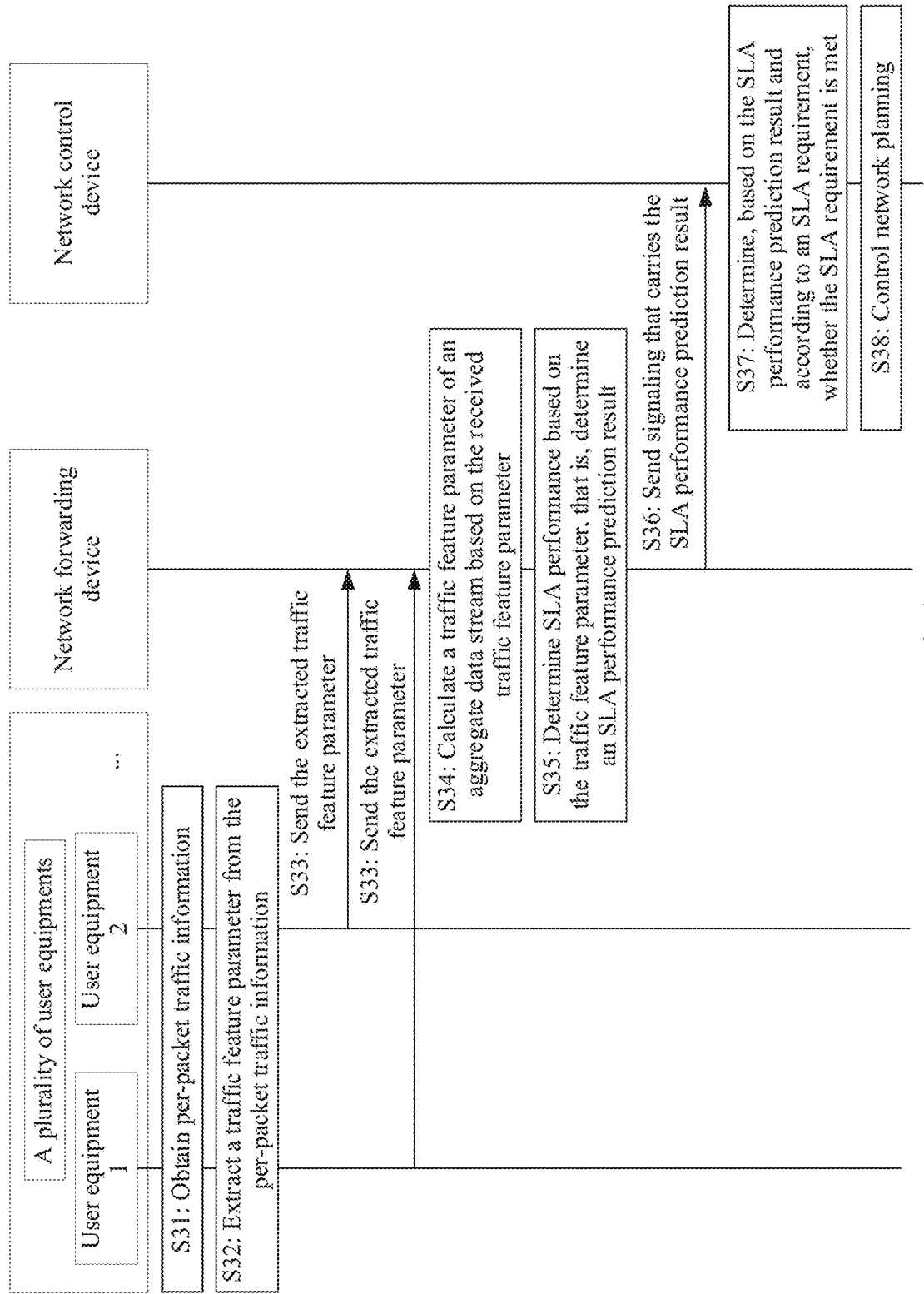
FIG. 8 is a schematic flowchart of still another SLA performance prediction method according to an embodiment of this application.

For specific implementations of the foregoing units, refer to related descriptions in an SLA performance prediction method shown in FIG. 4, FIG. 6, or FIG. 8. Details are not described herein.

In an FBB network architecture, the traffic receiving units 301 and their respective corresponding traffic feature learning units 302 may be deployed in different user equipments (for example, the first user equipments 10 in FIG. 1), the aggregation unit 303 may be deployed in a network forwarding device (for example, the router 11 in FIG. 1), and the SLA performance prediction unit 305 and the control and decision unit 306 may be deployed in the SDN controller 12.

In a 5G network architecture, the traffic receiving units 301 and their respective corresponding traffic feature learning units 302 may be deployed in different user equipments (for example, the second user equipments 14 in FIG. 1), the aggregation unit 303 may be deployed in a network forwarding device (for example, the base station 15 in FIG. 1), and the SLA performance prediction unit 305 and the control and decision unit 306 may be deployed in the mobile cloud engine (MCE) 16.

In some embodiments, the system 300 may include one traffic receiving unit 301 and one traffic feature learning unit 302. In this case, the traffic receiving unit 301 and the traffic feature learning unit 302 may be deployed in user equipment or a network forwarding device, to predict SLA performance of a single user, or predict SLA performance of the network forwarding device.

In some embodiments, an apparatus including the traffic feature learning unit 302 and/or an apparatus including the aggregation unit 303 may also be referred to as a traffic feature learning apparatus, and an apparatus including the SLA performance prediction unit 305 may also be referred to as an SLA performance prediction apparatus.

The following describes an SLA performance prediction method in this application with reference to three embodiments.

Embodiment 1

The following describes an SLA performance prediction method in an embodiment of this application with reference to FIG. 4. The method may be separately or jointly implemented by a first network device, a second network device, and a third network device. The first network device may be the first user equipment 10, the second user equipment 14, the router 11, the SDN controller 12, the ICP server 13, the base station 15, the mobile cloud engine 16, or the ICP server 13 in the system shown in FIG. 1. The second network device may be the router 11, the SDN controller 12, the ICP server 13, the base station 15, the mobile cloud engine 16, the ICP server 13, or the like in the system shown in FIG. 1. The third network device may be the router 11, the SDN controller 12, the base station 15, the mobile cloud engine 16, or the like in the system shown in FIG. 1. A fourth network device may be the SDN controller 12, the ICP server 13, or the like in the system shown in FIG. 1. The method may alternatively be implemented by some or all of the traffic receiving unit 301, the traffic feature learning unit 302, the aggregation unit 303, the SLA performance prediction unit 305, and the control and decision unit 306 in the system shown in FIG. 3. The method may include some or all of the following steps.

S11: The first network device obtains per-packet traffic information, where the per-packet traffic information includes an arrival timestamp and a packet length of each data packet in a raw data stream, and the raw data stream includes a plurality of data packets.

The following describes the per-packet traffic information with reference to different application scenarios.

In an application scenario, SLA performance that needs to be detected is SLA performance of a specified service used by a target user. For example, an SLA between a mobile network operator and the target user specifies that bandwidth of a video call service is 1 Gbps. In this case, a raw data stream is a data stream of the specified service of the target user, and per-packet traffic information is a timestamp and a packet length of a data packet in the raw data stream. The raw data stream may be a data packet specific to the specified service among data packets that have arrived at a device of the target user, or a data packet specific to the specified service of the target user among data packets that have arrived at a network forwarding device.

In another application scenario, SLA performance that needs to be detected is SLA performance of a network forwarding device for a specified service. For example, an SLA between a mobile network operator and a content service provider "YouTube" specifies that bandwidth of a "YouTube" service is 1 Gbps. In this case, a raw data stream is a data stream of the specified "YouTube" service, and per-packet traffic information is a timestamp and a packet length of a data packet that is in the raw data stream and that has arrived. In this case, the raw data stream is a data packet specific to the specified service among data packets that have arrived at the network forwarding device. Optionally, data packets in the raw data stream may come from different user equipments, or need to be sent to different user equipments.

In still another application scenario, SLA performance that needs to be detected is SLA performance of a network forwarding device. For example, an SLA between a mobile network operator and a network device service provider specifies that bandwidth for a 5G user is 2 Gbps. In this case, a raw data stream received by the network forwarding device may be data packets received from user equipments of a plurality of 5G users or need to be sent to a plurality of 5G users, and per-packet traffic information is a timestamp and a packet length of a data packet that is in the raw data stream and that has arrived.

The first network device may periodically collect statistics on network traffic. In each statistical period of network traffic, the first network device obtains per-packet traffic information of a specified service, to be specific, obtains and records a timestamp and a packet length of each data packet of the service that has arrived. Assuming that information of N+1 data packets is recorded and the N+1 data packets are arranged according to an arrival order, a timestamp sequence $T_0, T_1, T_2, \ldots, T_N$ and a packet length sequence $L_0, L_1, L_2, \ldots L_N$ may be obtained, where $T_i$ is a timestamp of an $(i+1)^{th}$ data packet of the N+1 data packets, and $L_i$ is a packet length of the $(i+1)^{th}$ data packet of the N+1 data packets.

It should be understood that step S11 may alternatively be performed by the traffic receiving unit in FIG. 3. The traffic receiving unit may alternatively be a functional module in the first network device.

It should be noted that some first network devices may implement the function of step S01 by using hardware or software, for example, by adding a chip, or by using a bypass server to obtain the per-packet traffic information through traffic mirroring. If an original device has a traffic monitoring module, software may be loaded on the module for implementation.

S12: The first network device extracts a traffic feature parameter from the per-packet traffic information, where the traffic feature parameter may include a time domain feature parameter and a packet length feature parameter, the time domain feature parameter is obtained based on the timestamp of each data packet in the raw data stream, and the packet length feature parameter is obtained based on the packet length of each data packet in the raw data stream. The following separately describes methods for obtaining the time domain feature parameter and the packet length feature parameter.

(a) Calculation of the Time Domain Feature Parameter:

First, an arrival time interval of each data packet in the raw data stream is obtained. To be specific, a difference between timestamps of two adjacent data packets is calculated. Time intervals of the data packets in the raw data stream constitute a time interval sequence according to an arrival order of the data packets, and may be expressed as follows:

$$Z=(z_1, z_2, \ldots, z_N)=(T_1-T_0, T_2-T_1, T_3-T_2, \ldots, T_N-T_{N-1}), \text{ where}$$

$z_i$ is an arrival time interval of the $(i+1)^{th}$ data packet.

The sample Z may comply with a Markovian arrival process to become a MAP model. A size of state space of the MAP model is M, where M is a positive integer greater than 1. A state transition rate matrix of the process is time domain feature parameters $D_0$ and $D_1$, namely, model parameters of the MAP model. The matrix is an M×M matrix, and describes a rate of transition between M states.

Further, the time interval sequence of the raw data stream may be fit based on the MAP model through maximum likelihood estimation, to determine the time domain feature parameters $D_0$ and $D_1$. Specifically, a likelihood function $L(D_0, D_1|Z)$ of the time interval sequence Z of the raw data stream may be expressed as follows:

$$L(D_0,D_1|Z)=f(Z|D_0,D_1)=\varphi(\Pi_{i=1}^{N-1} \exp(D_0 z_i)D_1)\exp(D_0 z_N)(D_1 1) \quad \text{Formula (1), where}$$

$L(D_0, D_1|Z)$ indicates a probability that the time domain feature parameter is $(D_0, D_1)$ when the time interval sequence Z is given, and $f(Z|D_0, D_1)$ indicates a joint probability distribution function of the time interval sequence Z when the time domain feature parameter $(D_0, D_1)$ is given.

The intermediate variable $\varphi$ is a row vector, and may be calculated by using the following formula (2):

$$\begin{cases} \varphi(D_0+D_1)=0 \\ \varphi 1 = 1 \end{cases} \quad \text{Formula (2)}$$

where 1 indicates an all-1 (all-one) column vector.

A value $(\hat{D}_0, \hat{D}_1)$ of the time domain feature parameter is a time domain feature parameter obtained when the likelihood function is a maximum value. To be specific, a maximum likelihood estimate $(\hat{D}_0, \hat{D}_1)$ of the time domain feature parameter may be calculated by using the following formula (3):

$$(\hat{D}_0,\hat{D}_1)=\arg\max f(z|D_0,D_1) \quad \text{Formula (3)}$$

(b) Calculation of the Packet Length Feature Parameter:

The first network device may collect statistics on packet lengths, in the per-packet traffic information, of all data packets that have arrived, to obtain the packet length feature parameter. The packet length feature parameter may be a maximum value of a packet length or a packet length with a highest probability (namely, a value of a maximum mode of a packet length). For example, the maximum value L, obtained through statistics collection, of the packet length is used as the packet length feature parameter.

A data stream of a cloud VR service is used as an example below for description.

Per-packet traffic information obtained by using the data stream of the cloud VR service as an example is shown in Table 1.

TABLE 1

| Sequence number | Arrival timestamp (seconds) | Packet length (bytes) |
| --- | --- | --- |
| 0 | 0.000000 | 1426 |
| 1 | 0.000002 | 1422 |
| 2 | 0.000021 | 1426 |
| 3 | 0.000023 | 1422 |
| ... | ... | ... |
| 144099 | 29.744823 | 1426 |
| 144100 | 29.744826 | 1422 |

Figure 5A:
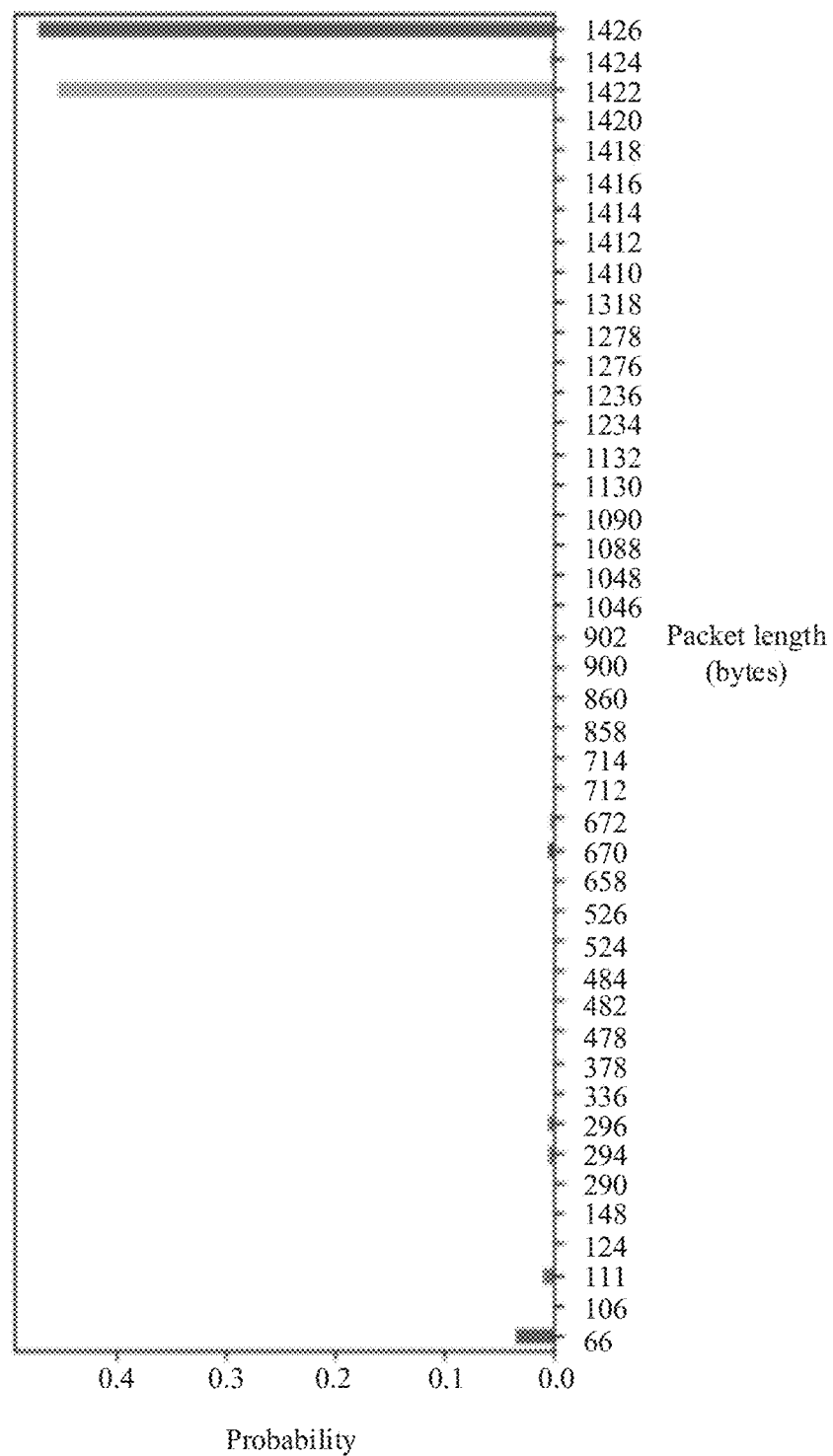
FIG. 5A is a histogram of statistical distribution of packet lengths of a data stream according to an embodiment of this application.

For a histogram of statistical distribution of packet lengths, refer to FIG. 5A. FIG. 5A shows a statistical quantity of packet lengths of data packets in a data stream. It can be learned that a probability of a data packet with a packet length of 1426 bytes is the highest, that is, a quantity of data packets with a packet length of 1426 bytes is the largest, and a value of the packet length feature parameter may be 1426×8 bits.

In addition, M=5, and the time domain feature parameter of the data stream may be obtained according to the method for calculating the time domain feature parameter in step S12:

$$D_0 = \begin{bmatrix} -402.496 & 0 & 0 & 0 & 0 \\ 0 & -87109.2 & 87109.2 & 0 & 0 \\ 0 & 0 & -87109.2 & 0 & 0 \\ 0 & 0 & 0 & -674205 & 674205 \\ 0 & 0 & 0 & 0 & -674205 \end{bmatrix}$$

$$D_1 = \begin{bmatrix} 204.483 & 18.5222 & 0 & 179.49 & 0 \\ 0 & 0 & 0 & 0 & 0 \\ 134.266 & 484.263 & 0 & 86490.7 & 0 \\ 0 & 0 & 0 & 0 & 0 \\ 535728 & 620396 & 0 & 235623 & 0 \end{bmatrix}$$

According to the method for calculating the packet length feature parameter in the foregoing method 1, it can be learned that the packet length feature parameter L of the per-packet traffic information is the packet length with the highest probability, that is, L=1426×8 bits.

In some embodiments, S12 may be implemented by the traffic feature learning unit in the system shown in FIG. 3.

In some embodiments, the first network device may be a distributed computing device, and the distributed computing device includes a first computing node and a plurality of second computing nodes. In an implementation, the raw data stream may include data packets of a plurality of services, the raw data stream is divided based on different services to obtain a plurality of data sub-streams, different second computing nodes may calculate traffic feature parameters of different services, and the first computing node may aggregate the traffic feature parameters calculated by the second computing nodes, for example, calculate a Kronecker sum of the time domain feature parameters calculated by the second computing nodes, and then use the Kronecker sum as the time domain feature parameter of the raw data stream, and use a largest packet length feature parameter as the packet length feature parameter of the raw data stream. In another implementation, the raw data stream may include data streams that come from a plurality of user equipments. In this case, the raw data stream may be divided based on different user equipments to obtain a plurality of data sub-streams. Similarly, the traffic feature parameter of the raw data stream may be obtained.

S13: The first network device sends, to the second network device, signaling that carries the traffic feature parameter.

It should be understood that step S13 may not be performed when the first network device and the second network device are a same device.

S14: The second network device obtains the traffic feature parameter from the signaling, and obtains network bandwidth, namely, a forwarding rate μ (unit: bps).

A packet forwarding rate equivalent to the forwarding rate μ (unit: bps) is as follows: $\mu_p=\mu/L$. To be specific, $\mu_p$ packets are forwarded per second.

The network bandwidth is bandwidth specified in an SLA agreement or bandwidth actually allocated by a network operator to a target user. For example, optical fiber bandwidth committed between the target user and the network operator is 2M. However, if it is found during a test that an indicator such as a latency committed in the SLA agreement cannot be met when the bandwidth of 2M is allocated to the target user, the network operator increases the optical fiber bandwidth, for example, to 3M. In this case, the obtained network bandwidth is the bandwidth actually allocated to the user, that is, 3M.

S15: The second network device determines distribution of SLA performance based on the traffic feature parameter and the network bandwidth, that is, determines an SLA performance prediction result. The SLA performance may include a latency. Optionally, the SLA performance may further include a cache queue length. The following separately describes methods for predicting the latency and the cache queue length.

Prediction of the Latency:

First, the second network device or the SLA performance prediction unit calculates a cumulative probability distribution function (cumulative distribution function, CDF) of the latency T based on the following formula (4):

$$F_T(x) = Pr[T \leq x] = 1 - \frac{1}{\lambda_p} \sum_{l=0}^{\infty} \pi_l D_1 t_l(x), \quad \text{Formula (4)}$$

where

Pr[T≤x] indicates a probability that the latency T of the raw data stream is not greater than x, and the intermediate variable $\lambda_p$ indicates an average quantity of data packets that arrive per second, and may be calculated by using the following formula (5):

$$\begin{cases} \varphi(D_0 + D_1) = 0 \\ \varphi\underline{1} = 1 \\ \lambda_p = \varphi D_1 \underline{1} \end{cases} \quad \text{Formula (5)}$$

In the formulas (4) and (5), $\varphi$, $D_0$, and $D_1$ may be obtained in step S12. Refer to related descriptions in step S12. Details are not described herein again.

The intermediate variable $\pi_l$, where l=0, 1, 2, . . . , indicates a steady-state distribution probability of a service queuing system, to be specific, a probability that a quantity of cached data packets (namely, the cache queue length) in the system in a steady state is l, and may be calculated by using the following formula (6):

$$\begin{cases} Q = \begin{bmatrix} D_0 & D_1 & 0 & 0 & \dots \\ \mu_p I & D_0 - \mu_p I & D_1 & 0 & \dots \\ 0 & \mu_p I & D_0 - \mu_p I & D_1 & \dots \\ 0 & 0 & \mu_p I & D_0 - \mu_p I & \dots \\ \vdots & \vdots & \vdots & \vdots & \vdots \end{bmatrix}, \\ \pi = [\pi_0, \pi_1, \dots, \pi_l, \dots] \\ \pi\underline{1} = 1 \\ \pi Q = \underline{0} \end{cases} \quad \text{Formula (6)}$$

where $\underline{0}$ indicates an all-0 (all-zero) row vector, I indicates a unit matrix, and an element of the unit matrix on a diagonal line is 1.

An auxiliary function is $t_l(x)$, where l=0, 1, 2, . . . . The auxiliary function may be calculated by using the following formula (7):

$$\begin{cases} B = \begin{bmatrix} D_0 - \mu_p I & D_1 & 0 & 0 & \dots \\ \mu_p I & D_0 - \mu_p I & D_1 & 0 & \dots \\ 0 & \mu_p I & D_0 - \mu_p I & D_1 & \dots \\ 0 & 0 & \mu_p I & D_0 - \mu_p I & \dots \\ \vdots & \vdots & \vdots & \vdots & \vdots \end{bmatrix} \\ t(x) = [t_0(x)^T, t_1(x)^T, \dots, t_l(x)^T, \dots]^T \\ \frac{d}{dx} t(x) = B \cdot t(x) \end{cases} \quad \text{Formula (7)}$$

Further, a cumulative probability value indicating a probability that the latency is not greater than each latency may be calculated based on the distribution function $F_T(x)$.

Figure 5B:
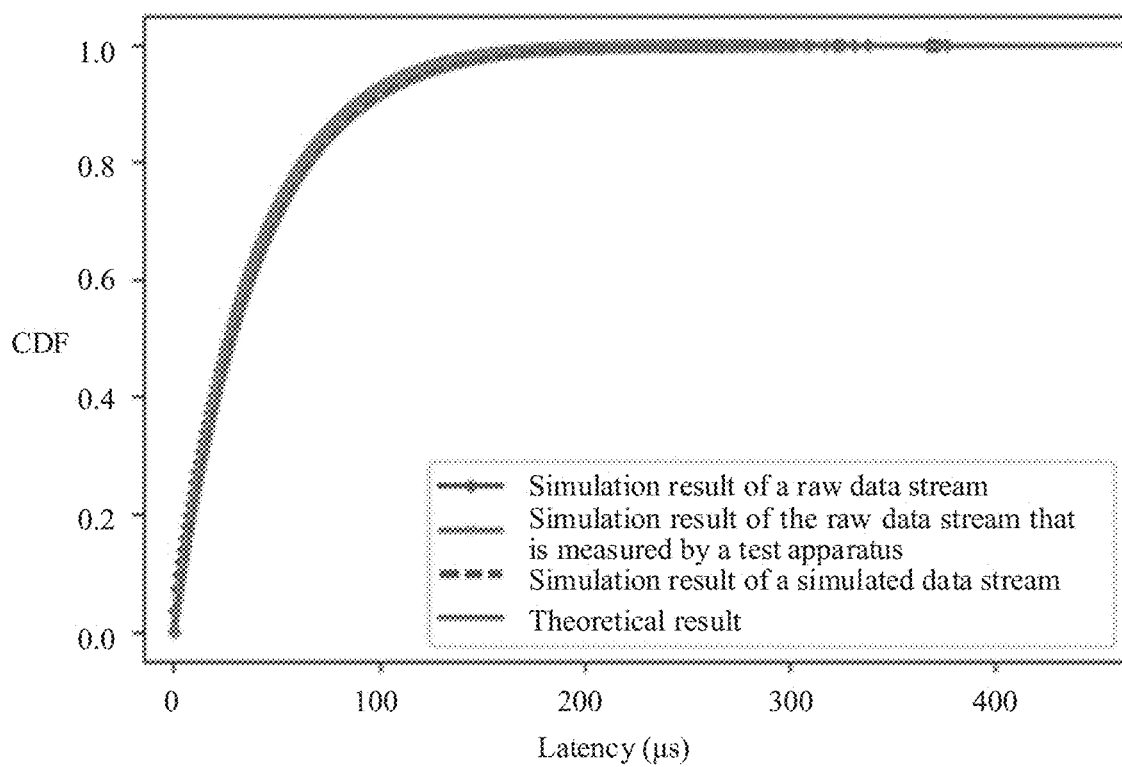
FIG. 5B is a schematic diagram of a data stream-based SLA performance prediction result according to an embodiment of this application.

The foregoing cloud VR data stream is used as an example. When the obtained network bandwidth is 1 Gbps, an SLA performance prediction result obtained in the present invention is shown in FIG. 5B. In FIG. 5B, the SLA performance prediction result is compared with SLA performance obtained by a simulator. It can be learned from FIG. 5B that cumulative distribution function (cumulative distribution function, CDF) results obtained based on a simulation result of the raw data stream, a simulation result of the raw data stream that is measured by a test apparatus, a simulation result of a simulated data stream, and a theoretical result are quite close, and four lines almost coincide. This testifies effectiveness of the present invention.

Cache Queue Length:

A cumulative probability distribution function F(y) of the cache queue length A may be expressed as follows:

$$F(y) = Pr[A \leq y] = \Sigma_{l=0}^{y} \pi_l \quad \text{Formula (8), where}$$

l is an integer, $\pi Q = \underline{0}$, $\pi = [\pi_0, \pi_1, \dots, \pi_l, \dots]$, and $\pi\underline{1} = 1$;

$$Q = \begin{bmatrix} D_0 & D_1 & 0 & 0 & \dots \\ \mu_p I & D_0 - \mu_p I & D_1 & 0 & \dots \\ 0 & \mu_p I & D_0 - \mu_p I & D_1 & \dots \\ 0 & 0 & \mu_p I & D_0 - \mu_p I & \dots \\ \vdots & \vdots & \vdots & \vdots & \vdots \end{bmatrix},$$

$\underline{0}$ indicates an all-0 row vector, I indicates a unit matrix, $\mu_p$ indicates a packet forwarding rate, $\mu_p = \mu/L$, L indicates the packet length feature parameter, and $\mu$ indicates the network bandwidth; and the distribution function F(y) indicates a cumulative probability value indicating a probability that the cache queue length A is not greater than y.

Further, a cumulative probability value indicating a probability that the cache queue length is not greater than each length may be calculated based on the distribution function F(y).

In some embodiments, S15 may be implemented by the SLA performance prediction unit in the system shown in FIG. 3.

It should be understood that step S15 may be implemented by a bypass server of the router 11, the SDN controller 12, the ICP server 13, the base station 15, the mobile cloud engine 16, the ICP server 13, or the like in the system shown in FIG. 1, or may be implemented by an additional chip in the second network device.

S16: The second network device sends, to the third network device, signaling that carries the SLA performance prediction result.

The SLA performance prediction result may include a cumulative probability value indicating a probability that the latency is less than a target latency, a cumulative probability value indicating a probability that the latency is less than a plurality of latencies (for example, 0 to 500 μs), a cumulative probability value indicating a probability that the cache queue length is less than a target length, and a cumulative probability value indicating a probability that the cache queue length is less than a plurality of lengths (for example, 1 to 100 packets). It should be further understood that the target length may be a length obtained by converting the target latency.

It should be understood that step S16 may not be performed when the second network device and the third network device are a same device.

In some embodiments, S15 is implemented by the SLA performance prediction unit, and the SLA performance prediction unit may send, to the control and decision unit, signaling that carries the SLA performance prediction result.

S17: The third network device receives the signaling, and determines, based on the SLA performance prediction result and according to an SLA requirement, whether the SLA requirement is met.

It should be understood that the SLA requirement specifies one or more target values of SLA performance. When a probability that the SLA performance prediction result meets the SLA requirement is greater than or not less than a preset threshold, it is determined that the SLA requirement is met, and in this case, SLA prediction in a next cycle may be further performed; or when a probability that the SLA performance prediction result meets the SLA requirement is less than the preset threshold, the SLA requirement is not met, and S18 may be performed.

For example, the target latency specified in the SLA is $T_{target}$. When a probability (namely, the first cumulative probability value) $Pr[T \leq T_{target}]$ that the latency T is less than or not greater than the target latency $T_{target}$ specified in the SLA is greater than or not less than the preset threshold, for example, 98% or 99%, it indicates that the latency meets an SLA requirement for the latency. Contrarily, when the probability $Pr[T \leq T_{target}]$ is less than the preset threshold, it indicates that the latency does not meet the SLA requirement.

An SLA requirement for a cloud VR service is as follows: A cumulative probability of a latency threshold 200 μs needs to reach 99%. However, an SLA prediction result shows that the cumulative probability of the latency 200 μs is 98%, that is, existing bandwidth does not meet the SLA requirement. The unit sends network planning control signaling to a controller (for example, the SDN controller), to prompt that the network bandwidth needs to be adjusted.

For another example, the third network device determines, based on the time domain feature parameter, the packet length feature parameter, and the network bandwidth, a second cumulative probability value indicating a probability that the cache queue length of the raw data stream is less than the target length. When the second cumulative probability value is greater than a second preset threshold, the cache queue lengths of the plurality of data packets meet an SLA requirement for the cache queue length; or when the second cumulative probability value is less than or equal to the second preset threshold, it indicates that the requirement is not met.

S18: The third network device controls network planning.

The third network device may be the SDN controller, the mobile cloud engine, or the like. The third network device may adjust the network bandwidth based on a determining result.

When the third network device does not have a network planning control capability, the third network device may send network planning control signaling to a controller (for example, the SDN controller or the mobile cloud engine), where the network planning control signaling is used to prompt that the network bandwidth needs to be adjusted.

Further, the controller adjusts the network bandwidth based on the network planning control signaling. For example, when the SLA is an SLA between a mobile network operator and a target user, the controller increases bandwidth for the target user. For another example, when the SLA is an SLA between a mobile network operator and a target user for a specified service, the controller increases bandwidth for the specified service of the target user. For another example, when the SLA is an SLA between a mobile network operator and a router for a specified service, the controller increases bandwidth of the router for the specified service.

In some embodiments, S18 may be implemented by the control and decision unit in the system shown in FIG. 3.

Embodiment 2

The following describes another SLA performance prediction method in an embodiment of this application with reference to FIG. 6. The method may be separately or jointly implemented by a first network device, a second network device, and a third network device. The first network device may be the first user equipment 10, the second user equipment 14, the router 11, the SDN controller 12, the ICP server 13, the base station 15, the mobile cloud engine 16, or the ICP server 13 in the system shown in FIG. 1. The second network device may be the router 11, the SDN controller 12, the ICP server 13, the base station 15, the mobile cloud engine 16, the ICP server 13, or the like in the system shown in FIG. 1. The third network device may be the router 11, the SDN controller 12, the base station 15, the mobile cloud engine 16, or the like in the system shown in FIG. 1. A fourth network device may be the SDN controller 12, the ICP server 13, or the like in the system shown in FIG. 1. The method may alternatively be implemented by some or all of the traffic receiving unit 301, the traffic feature learning unit 302, the aggregation unit 303, the traffic generation unit 304, the SLA performance prediction unit 305, and the control and decision unit 306 in the system shown in FIG. 3. The method may include some or all of the following steps.

The method may include but is not limited to some or all of the following steps.

S21: The first network device obtains per-packet traffic information, where the per-packet traffic information includes an arrival timestamp and a packet length of each of a plurality of data packets of a data stream, and the data stream includes the plurality of data packets.

For the data stream, the per-packet traffic information, and the like, refer to related descriptions in step S11 in Embodiment 1. Details are not described herein again.

S22: The first network device extracts a traffic feature parameter from the per-packet traffic information, where the traffic feature parameter may include a time domain feature parameter and a packet length feature parameter, the time domain feature parameter is obtained based on a timestamp of a data packet that has arrived, and the packet length feature parameter is obtained based on a packet length of the data packet that has arrived.

For a method for obtaining the traffic feature parameter, refer to related descriptions in step S12 in Embodiment 1. Details are not described herein again.

S23: The first network device sends, to the second network device, signaling that carries the traffic feature parameter.

S24: The second network device obtains the traffic feature parameter from the signaling.

For specific implementations of S23 and S24, refer to related descriptions in steps S13 and S14 in Embodiment 1. Details are not described herein again.

S25: The second network device generates a simulated data stream based on the traffic feature parameter and a MAP model.

The second network device or the traffic generation unit generates random numbers based on the time domain feature parameter and the MAP model, uses the random numbers as arrival time intervals of simulated data packets, and accumulates the arrival time intervals to obtain timestamps of the simulated data packets in the simulated data stream. Information of the simulated data stream is a time sequence including a timestamp and a packet length of each simulated data packet. The unit obtains a packet length value of each simulated data packet in the simulated data stream based on the packet length feature parameter.

Specifically, the second network device generates a time interval sequence of a plurality of simulated data packets based on the MAP model and the time domain feature parameter; generates a packet length sequence of the plurality of simulated data packets based on the packet length feature parameter; and further, obtains the timestamp and the packet length of each simulated data packet based on the time interval sequence and the packet length sequence. A timestamp of a $(j+1)^{th}$ simulated data packet is a cumulative value of first j time intervals in the time interval sequence, and a packet length of a $j^{th}$ simulated data packet is a $j^{th}$ packet length in the packet length sequence, where j is a positive integer not greater than a total quantity of simulated data packets in the simulated data stream. It should be understood that a timestamp of a $1^{st}$ simulated data packet may be 0.

Figure 7A:
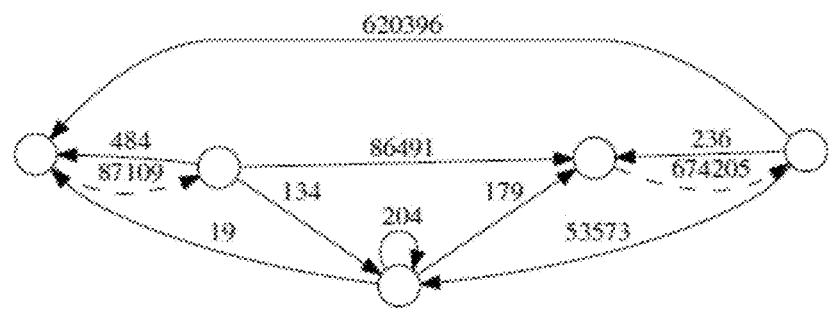
FIG. 7A is a schematic diagram of a state transition relationship of a MAP model according to an embodiment of this application.

For example, the traffic feature parameters $D_0$, $D_1$, and L are learned in Embodiment 1. The MAP($D_0$, $D_1$) model defines a state transition relationship. In a state transition diagram shown in FIG. 7A, a state transition rate matrix of the MAP($D_0$, $D_1$) model is $D_0$, $D_1$.

A random number sequence can be generated based on the MAP($D_0$, $D_1$) model as a time interval sequences of data packets. Arrival time intervals may be accumulated to obtain timestamps of data packets that are in the simulated data stream and that have arrived, as shown in Table 2 below.

TABLE 2

| Sequence number | Arrival time interval (seconds) | Arrival timestamp (seconds) | Packet length (bytes) |
|---|---|---|---|
| 0 | 0.004944 | 0.004944 | 1426 |
| 1 | 0.000001 | 0.004945 | 1426 |
| 2 | 0.000002 | 0.004947 | 1426 |
| . . . | . . . | . . . | . . . |
| 145333 | 0.000002 | 30.463466 | 1426 |
| 145334 | 0.000026 | 30.463492 | 1426 |

Assuming that a duration requirement for the simulated data stream is 30 seconds, an expected simulated data stream may be obtained by intercepting arrival timestamps and packet length information within the 30 seconds.

Statistics, such as duration, a quantity of packets, an average rate, and a mean, a variance, a skew, and a peak of arrival time intervals, of the generated simulated data stream may be calculated, and compared with those of raw traffic in a visualized manner, as shown in Table 3.

TABLE 3

| Sequence number | Raw traffic (raw trace) | Generated traffic (synthetic trace) | Theoretical value (theoretical value) |
|---|---|---|---|
| Mean | 0.000206 | 0.000206 | 0.000206 |
| Variance | $9.621696 \times 10^{-7}$ | $9.590777 \times 10^{-7}$ | $9.682801 \times 10^{-7}$ |
| Skew | $6.314854 \times 10^{-9}$ | $7.041548 \times 10^{-9}$ | $7.214419 \times 10^{-9}$ |
| Peak | $4.966177 \times 10^{-11}$ | $6.766496 \times 10^{-11}$ | $7.169670 \times 10^{-11}$ |

Figure 7B:
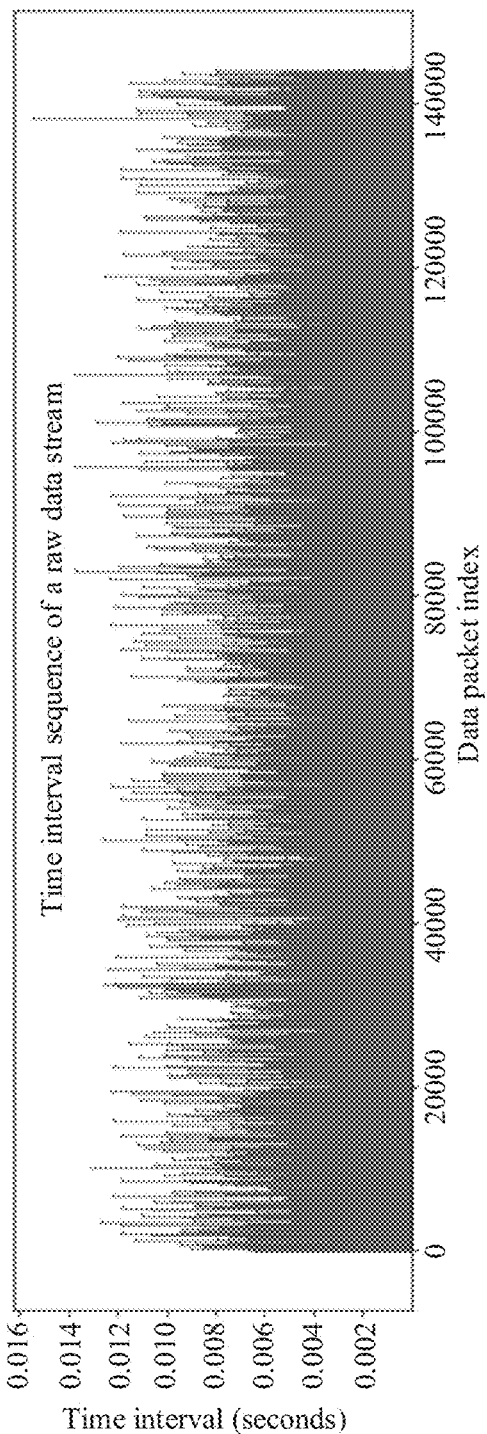
FIG. 7B is a diagram of comparison between time interval sequences of a raw data stream and a simulated data stream according to an embodiment of this application.
Figure 7B:
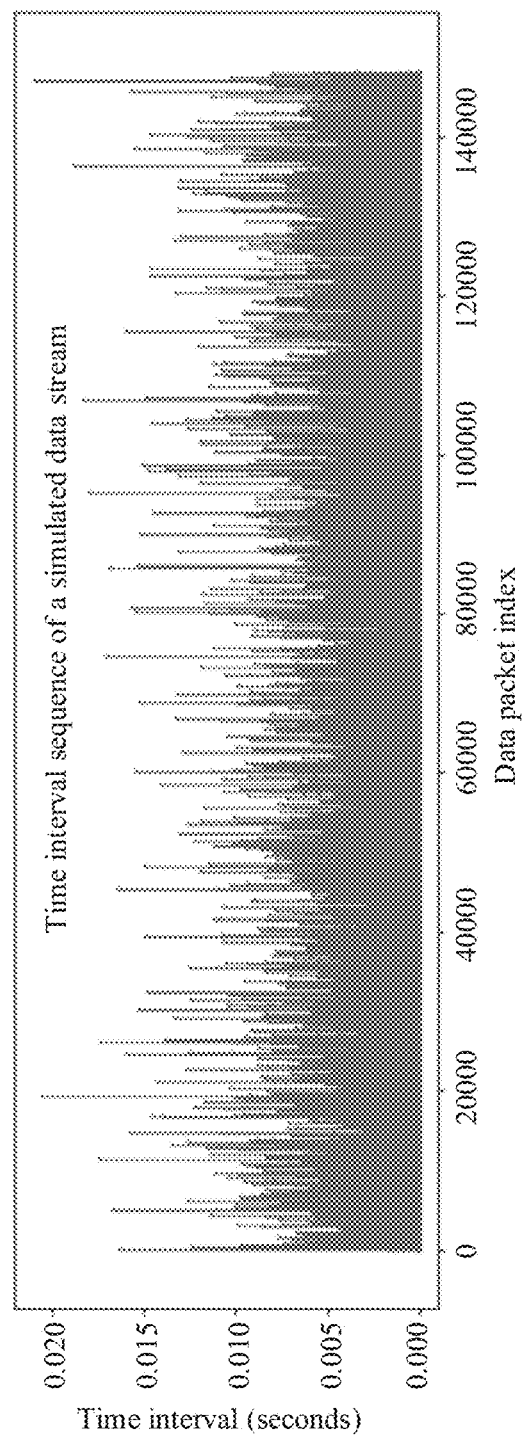
Figure 7C:
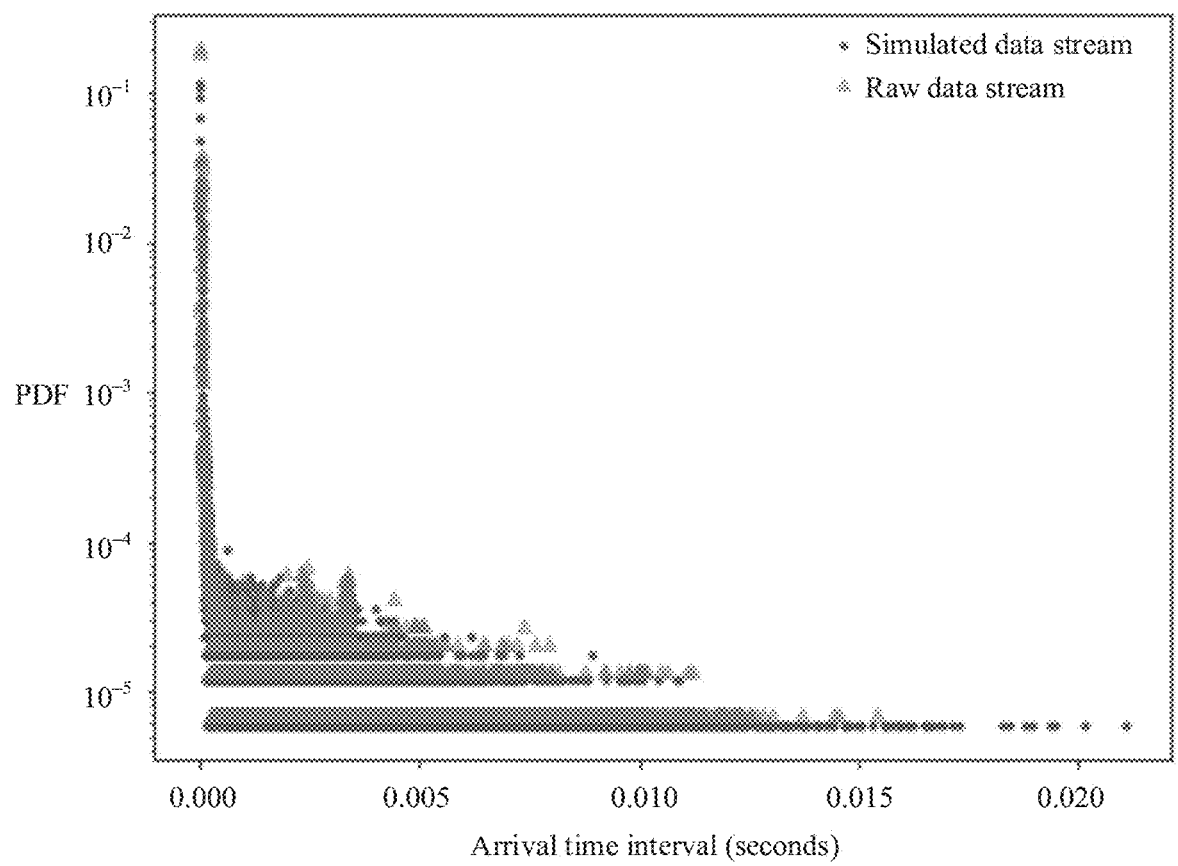
FIG. 7C is a diagram of comparison between probability distribution of time intervals of a raw data stream and a simulated data stream according to an embodiment of this application.

The following compares a raw data stream with the simulated data stream. FIG. 7B is a diagram of comparison between time interval sequences of the raw data stream and the simulated data stream. FIG. 7C is a diagram of comparison between probability distribution of arrival time intervals of the raw data stream and the simulated data stream. It can be learned from the foregoing tables and drawings that the generated simulated data stream is quite similar to the raw data stream, and probability density functions (probability density function) of arrival time intervals of data packets in the two data streams are quite similar. This can testify effectiveness of the MAP model. In addition, SLA performance can be predicted based on the generated simulated data stream.

S26: The second network device predicts SLA performance of the simulated data stream.

Specifically, the second network device may perform an SLA performance test on the simulated data stream based on the timestamp and the packet length of each simulated data packet in the simulated data stream. For example, the second network device may predict an SLA latency, a cache queue length, and the like based on the simulated data stream. In this case, an SLA performance test result of the simulated data stream may indicate an SLA performance prediction result of the raw data stream.

For example, the second network device determines, based on the timestamp and the packet length of each simulated data packet in the simulated data stream, a first cumulative probability value indicating a probability that the latency of the simulated data stream is less than a target latency. When the first cumulative probability value is greater than a first preset threshold, a latency of the raw data stream meets an SLA requirement for the latency.

For example, the second network device determines, based on the timestamp and the packet length of each simulated data packet in the simulated data stream, a second cumulative probability value indicating a probability that the cache queue length of the simulated data stream is less than a target length. When the second cumulative probability value is greater than a second preset threshold, the latency of the raw data stream meets an SLA requirement for the cache queue length.

In some embodiments, S26 may alternatively be implemented by the SLA performance prediction unit.

S27: The second network device sends, to the third network device, signaling that carries the SLA performance prediction result.

It should be understood that step S27 may not be performed when the second network device and the third network device are a same device.

In some embodiments, S05 is implemented by the SLA performance prediction unit, and the SLA performance prediction unit may send, to the control and decision unit, signaling that carries the SLA performance prediction result.

S28: The third network device receives the signaling, and determines, based on the SLA performance prediction result and according to an SLA requirement, whether the SLA requirement is met.

It should be understood that, for specific implementations of steps S21 to S24, refer to specific implementation of steps S11 to S14 in Embodiment 1; for step S27, reference may be made to the specific implementation of step S16 in Embodiment 1; and for step S28, reference may be made to the specific implementation of step S17 in Embodiment 1.

It should be understood that, when the SLA performance prediction result meets the SLA requirement, SLA prediction in a next cycle may be further performed; or when the SLA requirement is not met, S29 may be performed.

S29: The third network device controls network planning.

For specific implementations of steps S27, S28, and S29, refer to related descriptions in steps S16, S17, and S18 in Embodiment 1. Details are not described herein again.

The following describes another SLA performance prediction method in an embodiment of this application with reference to FIG. 8. The method may be implemented by a plurality of user equipments, a network forwarding device, and a network control device, or may be implemented by the system shown in FIG. 3. The user equipment may be the first user equipment or the second user equipment in the system shown in FIG. 1. The network forwarding device may be the base station, the router, or the like in the system shown in FIG. 1. The network control device may be the SDN controller, the mobile cloud engine, or the like in the system shown in FIG. 1. The method may include but is not limited to some or all of the following steps.

S31: The plurality of user equipments separately obtain per-packet traffic information.

The network forwarding device is configured to forward data packets of the plurality of user equipments (K user equipments are used as an example for description, where K is a positive integer). All data streams sent by the plurality of user equipments to a core network, a content server, and the like need to be forwarded by the network forwarding device. The network forwarding device receives the data packets from the plurality of user equipments. The data packets are sequentially arranged based on time at which the data packets arrive at the network forwarding device, and are aggregated to obtain a raw data stream (also referred to as an aggregate data stream). The network forwarding device forwards the data packets according to a FIFO rule.

Per-packet traffic information obtained by each user equipment includes a timestamp at which a data packet sent by the user equipment arrives at the network forwarding device, or a timestamp at which the user equipment successfully sends the data packet, and further includes a packet length of the data packet sent by the user equipment.

In some embodiments, K=1. In this case, the per-packet traffic information obtained by the user equipment is per-packet traffic information of the raw data stream. In this case, the raw data stream may be a data stream of a target user, or a data stream of a target device for a target service.

In some other embodiments, when K>1, the per-packet traffic information obtained by the user equipment is per-packet traffic information of the data packet that is in the raw data stream and that is sent by the user equipment. The raw data stream may be data packets of the plurality of user equipments for the target service, or may be data packets of the plurality of user equipments.

An implementation of obtaining, by each user equipment, per-packet traffic information of the user equipment may be as follows: After receiving a data packet, the network forwarding device sends receipt information to user equipment that sends the data packet, where the receipt information includes a timestamp of the data packet, to indicate time at which the data packet arrives at the network forwarding device. In this case, the user equipment may obtain, based on the receipt information received by the user equipment, a timestamp of each data packet sent by the user equipment. In another implementation, the network forwarding device may alternatively send, to each user equipment, a timestamp of a data packet sent by the user equipment, or send an arrival time interval of a data packet sent by the user equipment.

In some embodiments, the plurality of user equipments each may include a traffic receiving unit, configured to obtain the per-packet traffic information.

S32: The plurality of user equipments separately extract a traffic feature parameter from the obtained per-packet traffic information.

A specific implementation of extracting, by each user equipment, a traffic feature parameter from obtained per-packet traffic information is the same as the principle of extracting, by the first network device, the traffic feature parameter from the per-packet traffic information in step S12 in Embodiment 1. Refer to step S12 in Embodiment 1. Details are not described herein again.

In some embodiments, the plurality of user equipments each may include a traffic feature learning unit, configured to extract the traffic feature parameter from the per-packet traffic information.

S33: The plurality of user equipments separately send the extracted traffic feature parameter to the network forwarding device.

In a specific implementation, each user equipment may send, to the network forwarding device, signaling that carries a traffic feature parameter extracted by the user equipment.

S34: The network forwarding device calculates a traffic feature parameter of the raw data stream based on the received traffic feature parameter.

A time domain feature parameter of the raw data stream is as follows: $D_0 = D_0^{[1]} \oplus D_0^{[2]} \oplus \ldots \oplus D_0^{[K]}$, and $D_1 = D_1^{[1]} \oplus D_1^{[2]} \oplus \ldots \oplus D_1^{[K]}$, where $D_0^{[j]}$ indicates a time domain feature parameter extracted by user equipment j, $D_1^{[j]}$ indicates a time domain feature parameter extracted by the user equipment j, and $\oplus$ indicates a Kronecker sum (Kronecker sum) operation.

A packet length feature is as follows: $L = \max\{L^{[1]}, L^{[2]}, \ldots L^{[K]}\}$, where $L^{[j]}$ indicates a packet length feature parameter extracted by the user equipment j.

For example, a base station serves three users, and learns a traffic feature parameter of each user to obtain the following results:

A traffic feature parameter of a user 1 is as follows:

$$D_0^{[1]} = \begin{bmatrix} -385.289 & 0 \\ 0 & -80396.5 \end{bmatrix},$$

$$D_1^{[1]} = \begin{bmatrix} 175.891 & 209.398 \\ 3725.20 & 76671.3 \end{bmatrix}, \text{ and}$$

$$L^{[1]} = 1426 \times 8 \text{ bits}$$

A traffic feature parameter of a user 2 is as follows:

$$D_0^{[2]} = \begin{bmatrix} -401.670 & 0 \\ 0 & -80398.6 \end{bmatrix},$$

$$D_1^{[2]} = \begin{bmatrix} 173.275 & 228.395 \\ 3811.46 & 76587.1 \end{bmatrix}, \text{ and}$$

$$L^{[2]} = 1422 \times 8 \text{ bits}$$

A traffic feature parameter of a user 3 is as follows:

$$D_0^{[3]} = \begin{bmatrix} -397.028 & 0 \\ 0 & -79914.8 \end{bmatrix},$$

$$D_1^{[3]} = \begin{bmatrix} 171.722 & 225.306 \\ 3729.55 & 76185.2 \end{bmatrix}, \text{ and}$$

$$L^{[3]} = 1450 \times 8 \text{ bits}$$

The network forwarding device, such as the base station, aggregates the traffic feature parameters of the three users, and calculates a time domain feature parameter of an aggregate data stream.

In some embodiments, S34 may be implemented by the aggregation unit in the system shown in FIG. 3. In some embodiments, step S34 may alternatively be implemented by the network control device.

S35: The network forwarding device determines SLA performance based on the traffic feature parameter, that is, determines an SLA performance prediction result.

Specifically, the specific implementation of performing SLA performance prediction based on the traffic feature parameter in step S15 in Embodiment 1 or in steps S25 and S26 in Embodiment 2 may be used. Refer to related descriptions in Embodiment 1 or Embodiment 2. Details are not described herein again.

S36: The network forwarding device sends, to the network control device, signaling that carries the SLA performance prediction result.

It should be understood that step S36 may not be performed when the network forwarding device and the network control device are a same device.

S37: The network control device receives the signaling, and determines, based on the SLA performance prediction result and according to an SLA requirement, whether the SLA requirement is met.

S38: The network control device controls network planning.

It should be understood that specific implementations of S36, S37, and S38 are respectively the same as those of steps S16, S17, and S18 in Embodiment 1. Refer to related descriptions in steps S16, S17, and S18 in Embodiment 1. Details are not described herein again.

Figure 9:
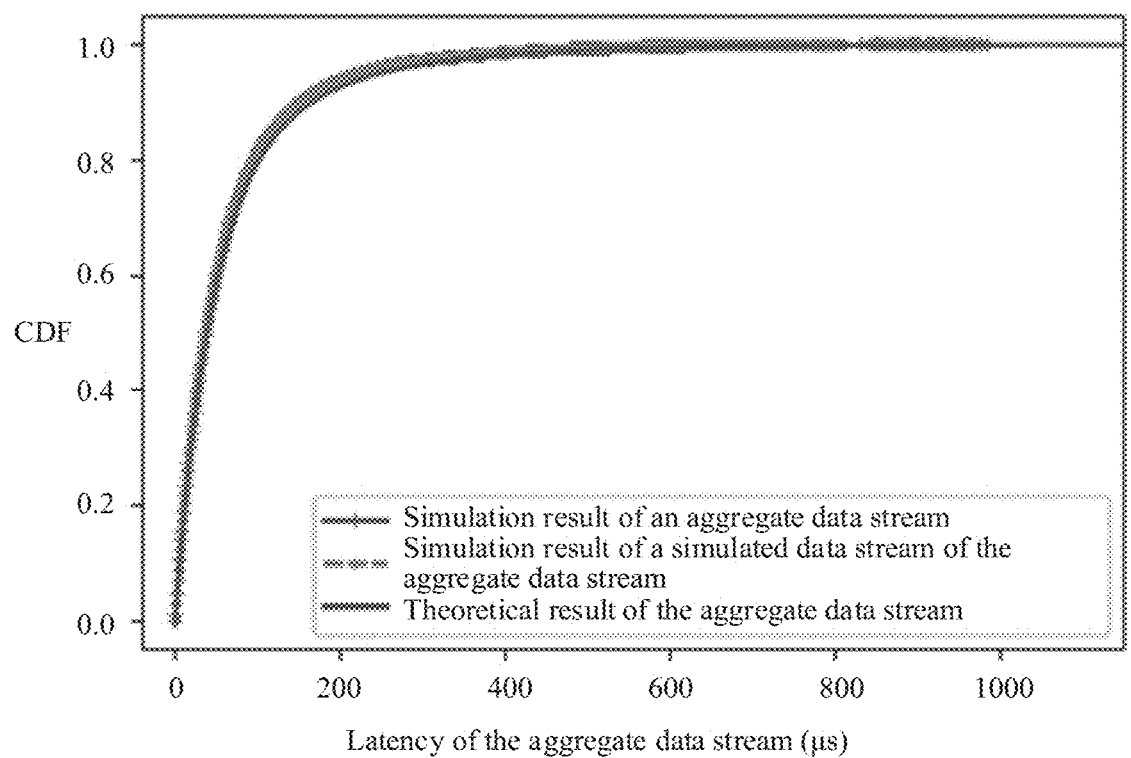
FIG. 9 is a schematic diagram of an SLA performance prediction result according to an embodiment of this application.

The foregoing three users UEs are used as an example. When bandwidth of the base station is 1 Gbps, the SLA performance prediction result obtained in the present invention is shown in FIG. 9. Cumulative distribution function (cumulative distribution function, CDF) results obtained based on a simulation result of the aggregate data stream, a simulation result of a simulated data stream of the aggregate data stream, and a theoretical result of the aggregate data stream are quite close, and three lines almost coincide. This testifies effectiveness of the present invention.

It should be understood that different SLA performance distribution curves are obtained through changes of a network bandwidth value. Each point on the SLA performance distribution curve corresponds to a latency threshold and a corresponding cumulative probability, to be specific, a cumulative probability obtained when the latency is the latency threshold. A relationship between the bandwidth, the latency threshold, and the cumulative probability may provide important reference for network planning, that is, may be a basis for network planning control.

The following describes a hardware apparatus in this application.

Figure 10:
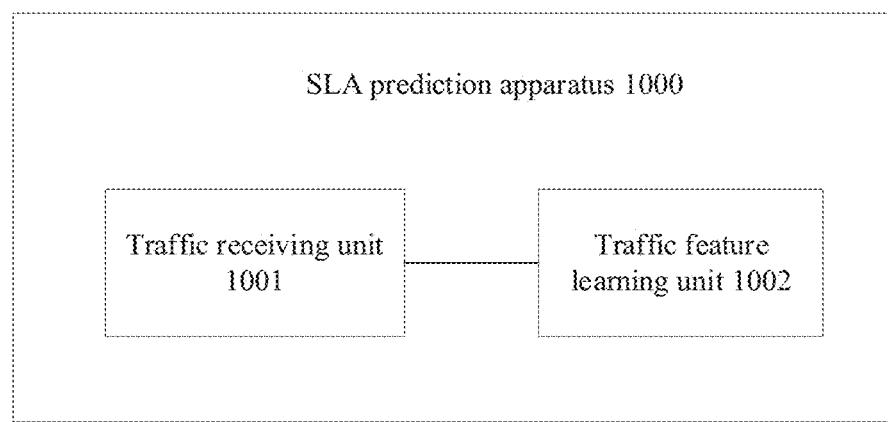
FIG. 10 is a schematic diagram of a structure of an SLA performance prediction apparatus according to an embodiment of this application.

FIG. 10 is a schematic diagram of a structure of an SLA prediction apparatus according to an embodiment of this application. The apparatus 1000 may be the first user equipment, the second user equipment, the base station, the router, the SDN controller, the mobile cloud engine, the content server, or the like in the system shown in FIG. 1, or may be the first network device in Embodiment 1 or Embodiment 2 or the user equipment in Embodiment 3. The apparatus may include but is not limited to some or all of the following units:

a traffic receiving unit 1001, configured to obtain timestamps of a plurality of data packets; and a traffic feature learning unit 1002, configured to determine an arrival time interval of each of the plurality of data packets based on the timestamps of the plurality of data packets, where arrival time intervals of the plurality of data packets constitute a time interval sequence according to an arrival order; determine time domain feature parameters of the plurality of data packets based on a Markovian arrival process MAP model and the time interval sequence, where the time domain feature parameters are model parameters of the MAP model; and determines packet length feature parameters based on the packet lengths of the plurality of data packets that have arrived, where the packet length feature parameters and the time domain feature parameters are used to predict SLA performance of the plurality of data packets.

The time domain feature parameters are a state transition rate matrix of the MAP model.

In a possible implementation, a likelihood function of the time interval sequence is as follows:

$$L(D_0, D_1 | Z) = \varphi \left( \prod_{i=1}^{N-1} \exp(D_0 z_i) D_1 \right) \exp(D_0 z_N)(D_1 \mathbf{1}); \text{ and}$$

$$\begin{cases} \varphi(D_0 + D_1) = 0 \\ \varphi \mathbf{1} = 1 \end{cases},$$

where $D_0$ and $D_1$ are the model parameters, Z is the time interval sequence, $Z=(z_1, z_2, \ldots, z_N)$, $z_i$ indicates an arrival time interval of an (i+1)$^{th}$ data packet that has arrived, $\underline{1}$ indicates an all-1 column vector, and the time domain feature parameters are model parameters obtained when the likelihood function is a maximum value.

In a possible implementation, the SLA performance includes a latency, and the apparatus 1000 further includes:

a sending unit, configured to send, to a second network device, signaling that carries the time domain feature parameters and the packet length feature parameters, so that the second network device determines, based on the time domain feature parameters, the packet length feature parameters, and network bandwidth, a first cumulative probability value indicating a probability that latencies of the plurality of data packets are less than a target latency, where when the first cumulative probability value is greater than a first preset threshold, the latencies of the plurality of data packets meet an SLA requirement.

In a possible implementation, the SLA performance includes a latency, and the apparatus further includes:

a first SLA performance prediction unit, configured to determine, based on the time domain feature parameters, the packet length feature parameters, and network bandwidth, a first cumulative probability value indicating a probability that latencies of the plurality of data packets are less than a target latency, where when the first cumulative probability value is greater than a first preset threshold, the latencies of the plurality of data packets meet an SLA requirement.

In a possible implementation, a cumulative probability distribution function of the latency T of the plurality of data packets is as follows:

$$F_T(x) = Pr[T \le x] = 1 - \frac{1}{\lambda_p}\sum_{l=0}^{\infty}\pi_l D_1 t_l(x),$$

where l is an integer, $\lambda_p = \varphi D_1 \underline{1}$, $\pi Q = \underline{0}$, $\pi = [\pi_0, \pi_1, \ldots, \pi_l, \ldots]$, and $\pi \underline{1} = 1$;

$$Q = \begin{bmatrix} D_0 & D_1 & 0 & 0 & \ldots \\ \mu_p I & D_0 - \mu_p I & D_1 & 0 & \ldots \\ 0 & \mu_p I & D_0 - \mu_p I & D_1 & \ldots \\ 0 & 0 & \mu_p I & D_0 - \mu_p I & \ldots \\ \vdots & \vdots & \vdots & \vdots & \vdots \end{bmatrix},$$

$\underline{0}$ indicates an all-0 row vector, I indicates a unit matrix, $\mu_p$ indicates a packet forwarding rate, $\mu_p = \mu/L$, L indicates the packet length feature parameters, and $\mu$ indicates the network bandwidth;

$t_l(x)$ indicates an auxiliary function, $t(x) = [t_0(x)^T, t_1(x)^T, \ldots, t_l(x)^T,]^T$, and $$\frac{d}{dx}t(x) = B \cdot t(x);$$

$$B = \begin{bmatrix} D_0 - \mu_p I & D_1 & 0 & 0 & \ldots \\ \mu_p I & D_0 - \mu_p I & D_1 & 0 & \ldots \\ 0 & \mu_p I & D_0 - \mu_p I & D_1 & \ldots \\ 0 & 0 & \mu_p I & D_0 - \mu_p I & \ldots \\ \vdots & \vdots & \vdots & \vdots & \vdots \end{bmatrix},$$

and O indicates an all-0 matrix; and the cumulative probability distribution function $F_T(x)$ is used to calculate the first cumulative probability value.

In a possible implementation, the apparatus further includes:

a traffic generation unit, configured to: generate a time interval sequence of a plurality of simulated data packets based on the MAP model and the time domain feature parameters, generate a packet length sequence of the plurality of simulated data packets based on the packet length feature parameters, and obtain a timestamp and a packet length of each of the plurality of simulated data packets based on the time interval sequence of the plurality of simulated data packets and the packet length sequence of the plurality of simulated data packets; and a second SLA performance prediction unit, configured to perform an SLA performance test on the plurality of simulated data packets based on timestamps and packet lengths of the plurality of simulated data packets, where an SLA performance test result of the plurality of simulated data packets is an SLA performance prediction result of the plurality of data packets.

In a possible implementation, that the traffic generation unit obtains a timestamp and a packet length of each of the plurality of simulated data packets based on the time interval sequence of the plurality of simulated data packets and the packet length sequence of the plurality of simulated data packets specifically includes:

determining that a timestamp of a (j+1)$^{th}$ simulated data packet is a cumulative value of first j time intervals in the time interval sequence of the plurality of simulated data packets, where j is a positive integer not greater than a total quantity of the plurality of simulated data packets; and determining that a packet length of a j$^{th}$ simulated data packet is a j$^{th}$ packet length in the packet length sequence of the plurality of simulated data packets.

In a possible implementation, the first SLA performance prediction unit is specifically configured to:

determine, based on the timestamps and the packet lengths of the plurality of simulated data packets, a first cumulative probability value indicating a probability that latencies of the plurality of simulated data packets are less than a target latency, where when the first cumulative probability value is greater than a first preset threshold, latencies of the plurality of data packets meet an SLA requirement.

In a possible implementation, the apparatus 1000 further includes:

A control and decision module, configured to control network planning when the first cumulative probability value is less than the first preset threshold.

In a possible implementation, the SLA performance includes a cache queue length, and the apparatus further includes:

a third SLA performance prediction unit, configured to determine, based on the time domain feature parameters, the packet length feature parameters, and the network bandwidth, a second cumulative probability value indicating a probability that cache queue lengths of the plurality of data packets are less than a target length, where when the second cumulative probability value is greater than a second preset threshold, the cache queue lengths of the plurality of data packets meet an SLA requirement.

In a possible implementation, a cumulative probability distribution function $F_A(y)$ of the cache queue length A is as follows:

$$F_A(y)=Pr[A \leq y]=\Sigma_{l=0}^{y}\pi_l, \text{ where}$$

l is an integer, $\pi Q=\underline{0}$, $\pi=[\pi_0, \pi_1, \ldots, \pi_l, \ldots]$, and $\pi\underline{1}=1$;

$$Q = \begin{bmatrix} D_0 & D_1 & 0 & 0 & \ldots \\ \mu_p I & D_0 - \mu_p I & D_1 & 0 & \ldots \\ 0 & \mu_p I & D_0 - \mu_p I & D_1 & \ldots \\ 0 & 0 & \mu_p I & D_0 - \mu_p I & \ldots \\ \vdots & \vdots & \vdots & \vdots & \vdots \end{bmatrix},$$

$\underline{0}$ indicates an all-0 row vector, I indicates a unit matrix, $\mu_p$ indicates a packet forwarding rate, $\mu_p=\mu/L$, L indicates the packet length feature parameters, and μ indicates the network bandwidth; and $F_A(y)$ is used to calculate the second cumulative probability value.

In a possible implementation, the plurality of data packets are in one of the following cases:

data packets of user equipment that are specific to a target service;

data packets received from a plurality of user equipments; or data packets that are specific to a target service and that are received from a plurality of user equipments.

Figure 11:
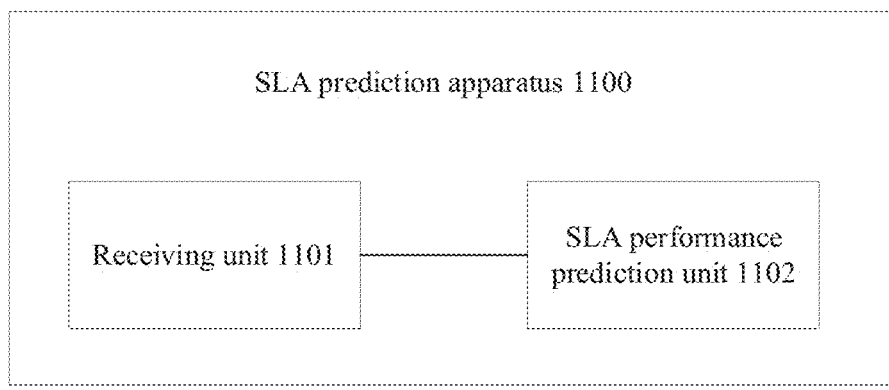
FIG. 11 is a schematic diagram of a structure of an SLA performance prediction apparatus according to an embodiment of this application.

FIG. 11 is a schematic diagram of a structure of an SLA prediction apparatus according to an embodiment of this application. The apparatus 1100 may be the base station, the router, the SDN controller, the mobile cloud engine, the content server, or the like in the system shown in FIG. 1, or may be the second network device in Embodiment 1 or Embodiment 2 or the network forwarding device or the network control device in Embodiment 3. The apparatus may include but is not limited to some or all of the following units:

a receiving unit 1101, configured to receive data streams from K first network devices respectively, to obtain a raw data stream, where K is a positive integer, where the receiving unit 1101 is further configured to receive time domain feature parameters and packet length feature parameters from the K first network devices respectively, where the time domain feature parameter of the first network device is determined by the first network device based on a Markovian arrival process MAP model and a time interval sequence, the time domain feature parameter of the first network device is a model parameter of the MAP model, the time interval sequence includes arrival time intervals, arranged according to an arrival order, of a plurality of data packets sent by the first network device, and the packet length feature parameter of the first network device is determined based on packet lengths of the plurality of the data packets; and an SLA performance prediction unit 1102, configured to predict SLA performance of the raw data stream based on a time domain feature parameter of the raw data stream and a packet length feature parameter of the raw data stream, where the time domain feature parameter of the raw data stream is determined based on the received time domain feature parameters, and the packet length feature parameter of the raw data stream is determined based on the received packet length feature parameters.

Optionally, K=1, the time domain feature parameter of the raw data stream is the time domain feature parameter of the first network device, and the packet length feature parameter of the raw data stream is the packet length feature parameter of the first network device.

Optionally, K is greater than 1, the time domain feature parameter of the raw data stream is a Kronecker sum of the received time domain feature parameters, and the packet length feature parameter of the raw data stream is a largest packet length feature parameter of the received packet length feature parameters.

In a possible implementation, a likelihood function of the time interval sequence is as follows:

$$L(D_0, D_1 \mid Z) = \varphi\left(\prod_{i=1}^{N-1} \exp(D_0 z_i)D_1\right)\exp(D_0 z_N)(D_1 \underline{1});$$

$$\text{and } \begin{cases} \varphi(D_0 + D_1) = 0 \\ \varphi\underline{1} = 1 \end{cases},$$

where $D_0$ and $D_1$ are the model parameters, Z is the time interval sequence, $Z=(z_1, z_2, \ldots, z_N)$, $z_i$ indicates an arrival time interval of an $(i+1)^{th}$ data packet that has arrived, $\underline{1}$ indicates an all-1 column vector, and the time domain feature parameters are model parameters obtained when the likelihood function is a maximum value.

In a possible implementation, the SLA performance includes a latency, and the SLA performance prediction unit is specifically configured to:

determine, based on the time domain feature parameter of the raw data stream, the packet length feature parameter of the raw data stream, and network bandwidth, a first cumulative probability value indicating a probability that a latency of the raw data stream is less than a target latency, where when the first cumulative probability value is greater than a first preset threshold, latencies of the plurality of data packets meet an SLA requirement.

In a possible implementation, a cumulative probability distribution function of the latency T of the raw data stream is as follows:

$$F_T(x) = Pr[T \leq x] = 1 - \frac{1}{\lambda_p}\sum_{l=0}^{\infty} \pi_l D_1 t_l(x),$$

where l is an integer, $\lambda_p=\varphi D_1 \underline{1}$, $\pi Q=\underline{0}$, $\pi=[\pi_0, \pi_1, \ldots, \pi_l, \ldots]$, and $\pi\underline{1}=1$;

$$Q = \begin{bmatrix} D_0 & D_1 & 0 & 0 & \ldots \\ \mu_p I & D_0 - \mu_p I & D_1 & 0 & \ldots \\ 0 & \mu_p I & D_0 - \mu_p I & D_1 & \ldots \\ 0 & 0 & \mu_p I & D_0 - \mu_p I & \ldots \\ \vdots & \vdots & \vdots & \vdots & \vdots \end{bmatrix},$$

$\underline{0}$ indicates an all-0 row vector, I indicates a unit matrix, $\mu_p$ indicates a packet forwarding rate, $\mu_p=\mu/L$, L indicates the packet length feature parameter of the raw data stream, and μ indicates the network bandwidth;

$t_l(x)$ indicates an auxiliary function, $t(x)=[t_0(x)^T, t_1(x)^T, \ldots, t_l(x)^T, \ldots]^T$, and $$\frac{d}{dx}t(x) = B \cdot t(x);$$

$$B = \begin{bmatrix} D_0 - \mu_p I & D_1 & 0 & 0 & \ldots \\ \mu_p I & D_0 - \mu_p I & D_1 & 0 & \ldots \\ 0 & \mu_p I & D_0 - \mu_p I & D_1 & \ldots \\ 0 & 0 & \mu_p I & D_0 - \mu_p I & \ldots \\ \vdots & \vdots & \vdots & \vdots & \vdots \end{bmatrix},$$

and O indicates an all-0 matrix; and the cumulative probability distribution function $F_T(x)$ is used to calculate the first cumulative probability value.

In a possible implementation, the apparatus further includes:

a traffic generation unit, configured to: generate a time interval sequence of a plurality of simulated data packets based on the MAP model and the time domain feature parameter of the first network device, generate a packet length sequence of the plurality of simulated data packets based on the packet length feature parameter of the first network device, and obtain a timestamp and a packet length of each of the plurality of simulated data packets based on the time interval sequence of the plurality of simulated data packets and the packet length sequence of the plurality of simulated data packets, where the SLA performance prediction unit is specifically configured to perform an SLA performance test on the plurality of simulated data packets based on timestamps and packet lengths of the plurality of simulated data packets, where an SLA performance test result of the plurality of simulated data packets is an SLA performance prediction result of the raw data stream.

In a possible implementation, that the traffic generation unit obtains a timestamp and a packet length of each of the plurality of simulated data packets based on the time interval sequence of the plurality of simulated data packets and the packet length sequence of the plurality of simulated data packets specifically includes:

determining that a timestamp of a $(j+1)^{th}$ simulated data packet is a cumulative value of first j time intervals in the time interval sequence of the plurality of simulated data packets, where j is a positive integer not greater than a total quantity of the plurality of simulated data packets; and determining that a packet length of a $j^{th}$ simulated data packet is a $j^{th}$ packet length in the packet length sequence of the plurality of simulated data packets.

In a possible implementation, the SLA performance prediction unit is specifically configured to:

determine, based on the timestamps and the packet lengths of the plurality of simulated data packets, a first cumulative probability value indicating a probability that latencies of the plurality of simulated data packets are less than a target latency, where when the first cumulative probability value is less than a first preset threshold, latencies of the plurality of data packets meet an SLA requirement.

In a possible implementation, the apparatus further includes:

a control and decision unit, configured to control network planning when the first cumulative probability value is greater than the first preset threshold.

In a possible implementation, the SLA performance includes a cache queue length, and the SLA performance prediction unit is configured to:

determine, based on the time domain feature parameter of the raw data stream, the packet length feature parameter of the raw data stream, and the network bandwidth, a second cumulative probability value indicating a probability that a cache queue length of the raw data stream is less than a target length, where when the second cumulative probability value is greater than a second preset threshold, the cache queue length of the raw data stream meets an SLA requirement.

Optionally, a cumulative probability distribution function $F_A(y)$ of the cache queue length A is as follows:

$F_A(y)=Pr[A \leq y]=\Sigma_{l=0}^{y} \pi_l$, where l is an integer, $\pi Q=\underline{0}$, $\pi=[\pi_0, \pi_1, \ldots, \pi_l, \ldots]$, and $\pi \underline{1}=1$;

$$Q = \begin{bmatrix} D_0 & D_1 & 0 & 0 & \ldots \\ \mu_p I & D_0 - \mu_p I & D_1 & 0 & \ldots \\ 0 & \mu_p I & D_0 - \mu_p I & D_1 & \ldots \\ 0 & 0 & \mu_p I & D_0 - \mu_p I & \ldots \\ \vdots & \vdots & \vdots & \vdots & \vdots \end{bmatrix},$$

$\underline{0}$ indicates an all-0 row vector, I indicates a unit matrix, $\mu_p$ indicates a packet forwarding rate, $\mu_p=\mu/L$, L indicates the packet length feature parameter of the raw data stream, and $\mu$ indicates the network bandwidth; and $F_A(y)$ is used to calculate the second cumulative probability value.

In a possible implementation, the raw data stream is in one of the following cases:

data packets sent by the K first network devices for a target service; or data packets sent by the K first network devices.

Figure 12:
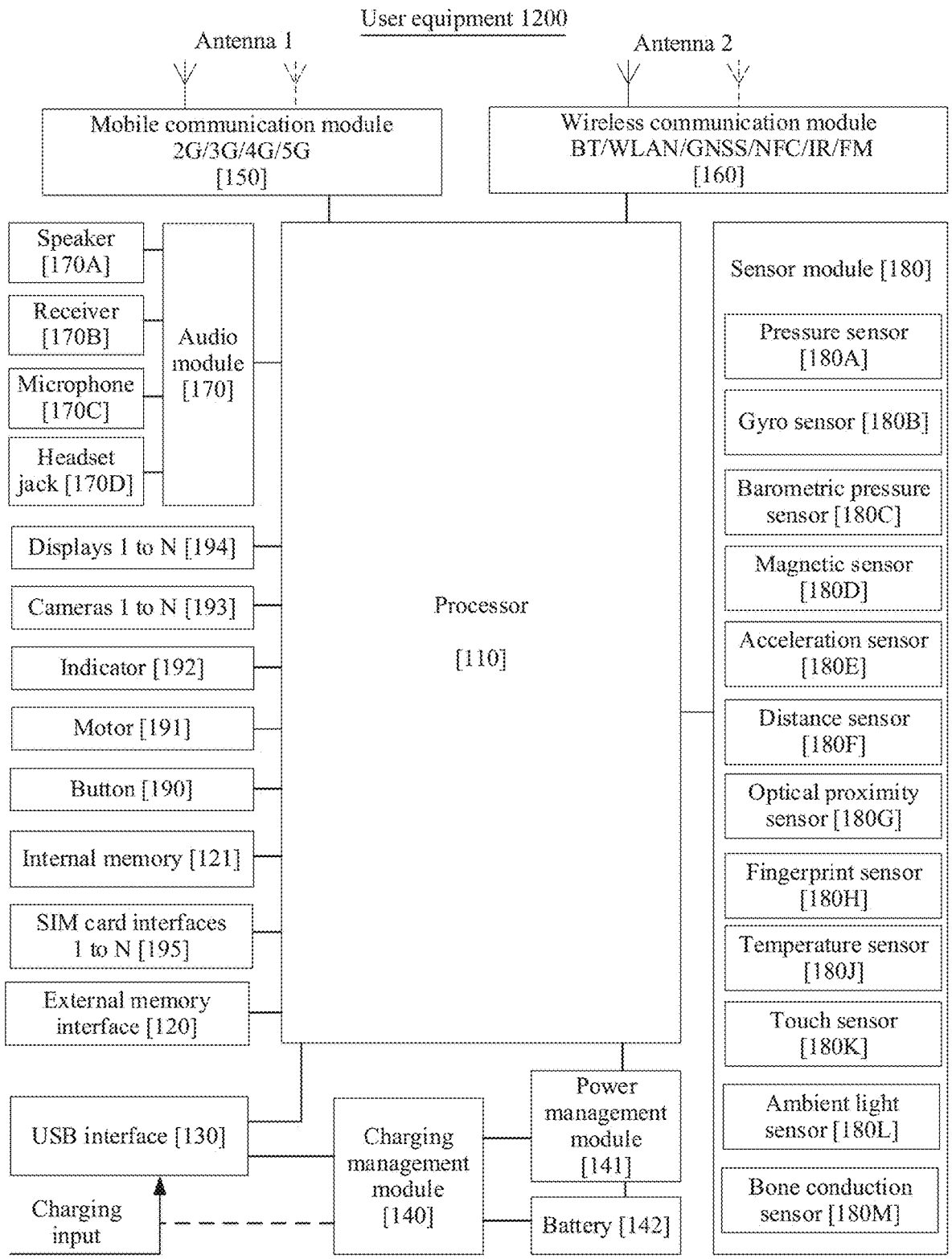
FIG. 12 is a schematic diagram of a structure of user equipment according to an embodiment of this application.

FIG. 12 shows example user equipment 1200 provided in an embodiment of this application. The user equipment 1200 may be a mobile phone, a tablet computer, a VR/AR device, or the like. The user equipment 1200 may be configured to implement the method implemented by the first network device in Embodiment 1, the first network device in Embodiment 2, or the user equipment in Embodiment 3, or implement the functions of the apparatus 1000. The user equipment 1200 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure shown in this embodiment of the present invention does not constitute a specific limitation on the user equipment 1200. In some other embodiments of this application, the user equipment 1200 may include more or fewer components than those shown in the figure, or some components may be combined, or some components may be split, or there may be a different component layout. The components shown in the figure may be implemented by using hardware, software, or a combination of software and hardware.

It can be understood that an interface connection relationship between the modules that is shown in this embodiment of the present invention is merely an example for description, and does not constitute a limitation on a structure of the user equipment 1200. In some other embodiments, the user equipment 1200 may alternatively use an interface connection manner different from that in the foregoing embodiment, or a combination of a plurality of interface connection manners.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent devices, or may be integrated into one or more processors. In some embodiments, the user equipment 1200 may alternatively include one or more processors 110.

The controller may be a nerve center and a command center of the user equipment 1200. The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache memory. The memory may store instructions or data that has been used or is cyclically used by the processor 110. If the processor 110 needs to use the instructions or the data again, the processor may directly invoke the instructions or the data from the memory. This avoids repeated access and reduces waiting time of the processor 110, and therefore improves efficiency of the user equipment 1200.

The charging management module 140 is configured to receive charging input from a charger. The charger may be a wireless charger or a wired charger. In some embodiments of wired charging, the charging management module 140 may receive charging input from a wired charger through the USB interface 130. In some embodiments of wireless charging, the charging management module 140 may receive wireless charging input through a wireless charging coil of the user equipment 1200. The charging management module 140 may further supply power to the electronic device by using the power management module 141 while charging the battery 142.

The power management module 141 is configured to connect to the battery 142, the charging management module 140, and the processor 110. The power management module 141 receives input of the battery 142 and/or the charging management module 140, and supplies power to the processor 110, the internal memory 121, an external memory, the display 194, the camera 193, the wireless communication module 160, and the like. The power management module 141 may be configured to monitor parameters such as a battery capacity, a battery cycle count, and a battery state of health (electric leakage and impedance). In some other embodiments, the power management module 141 may alternatively be disposed in the processor 110. In some other embodiments, the power management module 141 and the charging management module 140 may alternatively be disposed in a same device.

A wireless communication function of the user equipment 1200 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the user equipment 1200 may be configured to cover one or more communication frequency bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communication module 150 may provide a solution applied to the user equipment 1200 for wireless communication such as 2G/3G/4G/5G. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 may be disposed in a same device as at least some modules of the processor 110.

The wireless communication module 160 may provide a solution applied to the user equipment 1200 for wireless communication such as a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, or an infrared (infrared, IR) technology. The wireless communication module 160 may be one or more devices integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2. For example, the wireless communication module 160 may include a Bluetooth module, a Wi-Fi module, or the like.

In some embodiments, the antenna 1 and the mobile communication module 150 in the user equipment 1200 are coupled, and the antenna 2 and the wireless communication module 160 are coupled, so that the user equipment 1200 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite-based augmentation system (satellite-based augmentation system, SBAS).

The user equipment 1200 may implement a display function by using the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs that execute an instruction to generate or change display information.

The display 194 is configured to display an image, a video, or the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flex light-emitting diode, FLED), a mini-LED, a micro-LED, a micro-OLED, a quantum dot light-emitting diode (quantum dot light-emitting diode, QLED), or the like. In some embodiments, the user equipment 1200 may include one or N displays 194, where N is a positive integer greater than 1. In this embodiment of this application, the display 194 may serve as an output apparatus to display response information for a user command, a GUI, and the like.

The user equipment 1200 may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV. In some embodiments, the user equipment 1200 may include one or N cameras 193, where N is a positive integer greater than 1.

The digital signal processor is configured to process a digital signal, and may process another digital signal in addition to the digital image signal. For example, when the user equipment 1200 selects a frequency, the digital signal processor is configured to perform Fourier transform on frequency energy, and the like.

The video codec is configured to compress or decompress a digital video. The user equipment 1200 may support one or more types of video codecs. In this way, the user equipment 1200 may play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor. The NPU quickly processes input information with reference to a structure of a biological neural network, for example, a transfer mode between human brain neurons, and may further continuously perform self-learning. Applications such as intelligent cognition of the user equipment 1200, for example, image recognition, facial recognition, speech recognition, and text understanding, may be implemented by the NPU.

The external memory interface 120 may be configured to connect to an external storage card, for example, a microSD card, to extend a storage capability of the user equipment 1200. The external storage card communicates with the processor 110 through the external memory interface 120, to implement a data storage function. For example, data such as music, a photo, and a video is stored in the external storage card.

The internal memory 121 may be configured to store one or more computer programs, and the one or more computer programs include instructions. The processor 110 may run the instructions stored in the internal memory 121, so that the user equipment 1200 performs a data sharing method provided in some embodiments of this application, various function applications, data processing, and the like. The internal memory 121 may include a program storage area and a data storage area. The program storage area may store an operating system. The program storage area may further store one or more applications (for example, gallery and contacts), and the like. The data storage area may store data (for example, a photo and a contact) created during use of the user equipment 1200. In addition, the internal memory 121 may include a high-speed random access memory, or may include a nonvolatile memory, for example, at least one magnetic disk storage device, a flash memory, or a universal flash storage (universal flash storage, UFS).

The user equipment 1200 may implement audio functions, for example, a music playing function and a recording function, by using the audio module 170, the speaker 170A, the receiver 170B, the microphone 170C, the headset jack 170D, the application processor, and the like.

The audio module 170 is configured to convert digital audio information into analog audio signal output, and is also configured to convert analog audio input into a digital audio signal. The audio module 170 may be further configured to encode and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an electrical audio signal into a sound signal. The user equipment 1200 may listen to music or answer a hands-free call by using the speaker 170A. In this embodiment of this application, the speaker 170A may serve as an output apparatus to output response information for a user command.

The receiver 170B, also referred to as an "earpiece", is configured to convert an electrical audio signal into a sound signal. When a call is answered or a voice message is listened to by using the user equipment 1200, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the user equipment 1200. In some other embodiments, the user equipment 1200 may be provided with two microphones 170C, to capture a sound signal and further implement a noise reduction function. In some other embodiments, the user equipment 1200 may alternatively be provided with three, four, or more microphones 170C, to capture a sound signal, reduce noise, identify a sound source, implement a directional recording function, and the like. In some embodiments, the microphones 170C may be configured to capture a user instruction in an audio format.

The headset jack 170D is configured to connect to a wired headset. The headset jack 170D may be the USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The user equipment 1200 determines pressure intensity based on a capacitance change. When a touch operation is performed on the display 194, the user equipment 1200 detects intensity of the touch operation based on the pressure sensor 180A. The user equipment 1200 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on the Messages icon, an instruction for creating a new SMS message is executed.

The gyro sensor 180B may be configured to determine a motion posture of the user equipment 1200. In some embodiments, an angular velocity of the user equipment 1200 around three axes (that is, axes x, y, and z) may be determined by using the gyro sensor 180B. The gyro sensor 180B may be configured to implement image stabilization during photographing. For example, when the shutter is pressed, the gyro sensor 180B detects an angle at which the user equipment 1200 shakes, calculates, based on the angle, a distance for which a lens module needs to compensate, and allows the lens to cancel the shake of the user equipment 1200 through reverse motion, to implement image stabilization. The gyro sensor 180B may be further used in a navigation scenario and a somatic game scenario.

The barometric pressure sensor 180C is configured to measure barometric pressure. In some embodiments, the user equipment 1200 calculates an altitude based on a barometric pressure value measured by the barometric pressure sensor 180C, to assist in positioning and navigation.

The magnetic sensor 180D includes a Hall effect sensor. The user equipment 1200 may detect opening and closing of a flip cover by using the magnetic sensor 180D. In some embodiments, when the user equipment 1200 is a clamshell phone, the user equipment 1200 may detect opening and closing of a flip cover based on the magnetic sensor 180D. Further, a feature such as automatic unlocking upon opening of the flip cover is set based on a detected opening or closing state of the flip cover.

The acceleration sensor 180E may detect accelerations in various directions (usually on three axes) of the user equipment 1200, may detect a magnitude and a direction of gravity when the user equipment 1200 is still, and may be further configured to identify a posture of an electronic device and used in applications such as landscape/portrait mode switching and a pedometer.

The distance sensor 180F is configured to measure a distance. The user equipment 1200 may measure a distance by using infrared or laser. In some embodiments, in a photographing scenario, the user equipment 1200 may measure a distance by using the distance sensor 180F, to implement quick focusing.

For example, the optical proximity sensor 180G may include a light-emitting diode (LED) and an optical detector, for example, a photodiode. The light-emitting diode may be an infrared light-emitting diode. The user equipment 1200 emits infrared light by using the light-emitting diode. The user equipment 1200 detects infrared reflected light from a nearby object by using the photodiode. When sufficient reflected light is detected, the user equipment 1200 may determine that there is an object near the user equipment 1200. When insufficient reflected light is detected, the user equipment 1200 may determine that there is no object near the user equipment 1200. The user equipment 1200 may detect, by using the optical proximity sensor 180G, that the user holds the user equipment 1200 close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The user equipment 1200 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the user equipment 1200 is in a pocket, to avoid an accidental touch.

The fingerprint sensor 180H is configured to capture a fingerprint. The user equipment 1200 may use a feature of the captured fingerprint to implement fingerprint-based unlocking, application lock access, fingerprint-based photographing, fingerprint-based call answering, and the like.

The temperature sensor 180J is configured to detect temperature. In some embodiments, the user equipment 1200 executes a temperature processing policy based on the temperature detected by the temperature sensor 180J. For example, when the temperature reported by the temperature sensor 180J exceeds a threshold, the user equipment 1200 degrades performance of a processor near the temperature sensor 180J, to reduce power consumption and implement thermal protection. In some other embodiments, when the temperature is less than another threshold, the user equipment 1200 heats the battery 142 to prevent the user equipment 1200 from being shut down abnormally due to low temperature. In some other embodiments, when the temperature is less than still another threshold, the user equipment 1200 boosts an output voltage of the battery 142 to avoid abnormal shutdown due to low temperature.

The touch sensor 180K may also be referred to as a touch panel or a touch-sensitive surface. The touch sensor 180K may be disposed on the display 194, and the touch sensor 180K and the display 194 form a touchscreen, which is also referred to as a "touch control screen". The touch sensor 180K is configured to detect a touch operation performed on or near the touch sensor. The touch sensor may transmit the detected touch operation to the application processor to determine a type of a touch event. Visual output related to the touch operation may be provided by using the display 194. In some other embodiments, the touch sensor 180K may alternatively be disposed on a surface of the user equipment 1200 at a location different from a location of the display 194. In some embodiments, the touch sensor 180K may serve as an input apparatus to receive a user instruction in a text format that is entered by a user, or another user operation.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may alternatively be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button or a touch button. The user equipment 1200 may receive input on the button, and generate button signal input related to user settings and function control of the user equipment 1200.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effect. The motor 191 may also correspond to different vibration feedback effect for touch operations performed on different areas of the display 194. Different application scenarios (for example, a time reminder, information receiving, an alarm clock, and a game) may also correspond to different vibration feedback effect. Touch vibration feedback effect may be further customized.

The indicator 192 may be an indicator light, and may be configured to indicate a charging status and a battery level change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the user equipment 1200. The user equipment 1200 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 is also compatible with different types of SIM cards. The SIM card interface 195 is also compatible with an external storage card. The user equipment 1200 interacts with a network through the SIM card, to implement functions such as calling and data communication. In some embodiments, the user equipment 1200 uses an eSIM, namely, an embedded SIM card. The eSIM card may be embedded into the user equipment 1200, and cannot be separated from the user equipment 1200.

The following describes an example network device 1300 provided in an embodiment of this application. The network device 1300 may implement the method performed by the first network device, the second network device, the third network device, the network forwarding device, or the network control device mentioned in Embodiment 1, Embodiment 2, or Embodiment 3, or implement the functions of the apparatus 1000 or the apparatus 1100. The network device 1300 shown in FIG. 13 includes a memory 1301, a processor 1302, a communication interface 1303, and a bus 1304. The memory 1301, the processor 1302, and the communication interface 1303 are communicatively connected to each other through the bus 1304.

The memory 1301 may be a read-only memory (Read-Only Memory, ROM), a static storage device, a dynamic storage device, or a random access memory (Random Access Memory, RAM). The memory 1301 may store a program. When the program stored in the memory 1301 is executed by the processor 1302, the processor 1302 and the communication interface 1303 are configured to perform the method or the steps performed by one or more of the first network device, the second network device, the third network device, the network forwarding device, the network control device, and the like mentioned in Embodiment 1, Embodiment 2, and Embodiment 3 of the method in this application.

The processor 1302 may be a general-purpose central processing unit (Central Processing Unit, CPU), a microprocessor, an application-specific integrated circuit (Application-Specific Integrated Circuit, ASIC), a graphics processing unit (graphics processing unit, GPU), or one or more integrated circuits, and is configured to execute a related program, to implement functions that need to be performed by the units in the apparatus 1000 or the apparatus 1100 in embodiments of this application, or perform the method or the steps performed by one or more of the first network device, the second network device, the third network device, the network forwarding device, the network control device, and the like mentioned in Embodiment 1, Embodiment 2, and Embodiment 3 of the method in this application.

The processor 1302 may alternatively be an integrated circuit chip and has a signal processing capability. During implementation, steps of the SLA performance prediction method in this application may be performed by an integrated logic circuit of hardware in the processor 1302 or through instructions in a form of software. The processor 1302 may alternatively be a general-purpose processor, a digital signal processor (Digital Signal Processor, DSP), an application-specific integrated circuit (ASIC), a field programmable gate array (Field Programmable Gate Array, FPGA) or another programmable logic device, a discrete gate or transistor logic device, or a discrete hardware component, and can implement or perform the methods, steps, and logical block diagrams disclosed in embodiments of this application. The general-purpose processor may be a microprocessor, or the processor may be any conventional processor or the like. The steps of the methods disclosed with reference to embodiments of this application may be directly performed by a hardware decoding processor, or may be performed by a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory 1301. The processor 1302 reads information in the memory 1301, and performs, based on hardware of the processor 1302, functions that need to be performed by the units in the apparatus 1000 or the apparatus 1100 in embodiments of this application.

The communication interface 1303 uses a transceiver apparatus, for example, but not limited to, a transceiver, to implement communication between the network device 1300 and another device or a communication network.

The bus 1304 may include a path for transmitting information between the components (for example, the memory 1301, the processor 1302, and the communication interface 1303) of the network device 1300.

Figure 13:
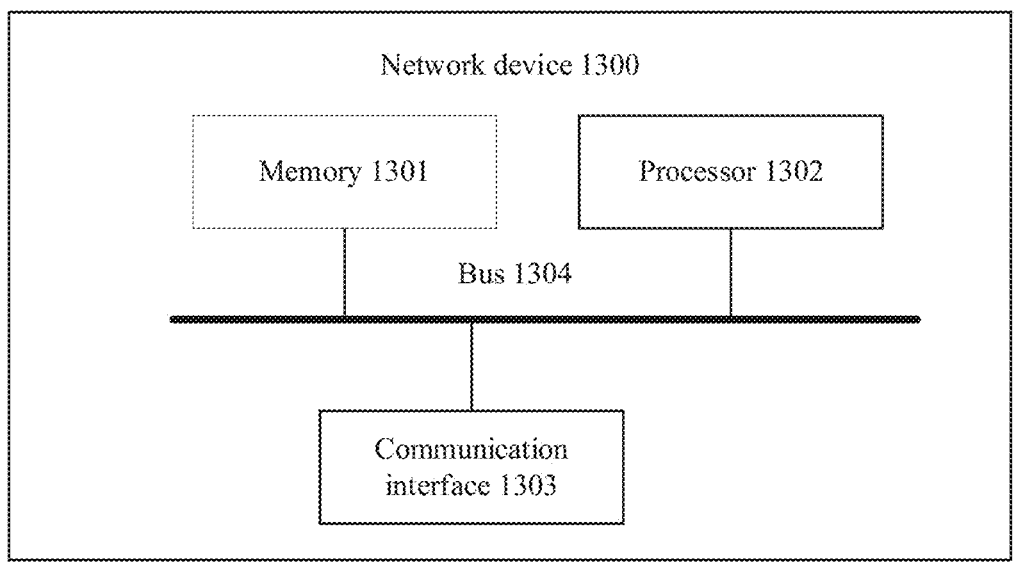
FIG. 13 is a schematic diagram of a structure of a network device according to an embodiment of this application.

It should be noted that, although only the memory, the processor, and the communication interface are shown in the network device 1300 in FIG. 13, during specific implementation, a person skilled in the art should understand that the network device 1300 further includes other components required for implementing normal operation. In addition, according to a specific requirement, a person skilled in the art should understand that the network device 1300 may further include a hardware component for implementing another additional function. In addition, a person skilled in the art should understand that the network device 1300 may alternatively include only a component required for implementing embodiments of this application, and does not need to include all the components shown in FIG. 13.

A person of ordinary skill in the art may be aware that, in combination with examples described in embodiments disclosed in this specification, units and algorithm steps can be implemented by electronic hardware or a combination of computer software and electronic hardware. Whether the functions are performed by hardware or software depends on particular applications and design constraints of technical solutions. A person skilled in the art may use different methods to implement the described functions for each particular application, but it should not be considered that the implementation goes beyond the scope of this application.

A person skilled in the art can understand that the functions described with reference to various illustrative logical blocks, modules, and algorithm steps disclosed and described in this specification may be implemented by hardware, software, firmware, or any combination thereof. If implemented by software, the functions described with reference to the illustrative logical blocks, modules, and steps may be stored in or transmitted through a computer-readable medium as one or more instructions or code and executed by a hardware-based processing unit. The computer-readable medium may include a computer-readable storage medium, which corresponds to a tangible medium such as a data storage medium, or may include any communication medium that facilitates transmission of a computer program from one place to another place (for example, according to a communication protocol). In this manner, the computer-readable medium may generally correspond to: (1) a non-transitory tangible computer-readable storage medium, or (2) a communication medium such as a signal or a carrier. The data storage medium may be any usable medium that can be accessed by one or more computers or one or more processors to retrieve instructions, code, and/or data structures for implementing technologies described in this application. A computer program product may include a computer-readable medium.

As an example rather than a limitation, the computer-readable storage medium may include a RAM, a ROM, an EEPROM, a CD-ROM or another compact disc storage apparatus, a magnetic disk storage apparatus or another magnetic storage apparatus, a flash memory, or any other medium that can be used to store desired program code in a form of instructions or data structures and that can be accessed by a computer. In addition, any connection is properly referred to as a computer-readable medium. For example, if an instruction is transmitted from a website, a server, or another remote source through a coaxial cable, an optical fiber, a twisted pair, a digital subscriber line (DSL), or a wireless technology such as infrared, radio, or microwave, the coaxial cable, the optical fiber, the twisted pair, the DSL, or the wireless technology such as infrared, radio, or microwave is included in a definition of the medium. However, it should be understood that the computer-readable storage medium and the data storage medium do not include connections, carriers, signals, or other transitory media, but are actually non-transitory tangible storage media. Disks and discs used in this specification include a compact disc (CD), a laser disc, an optical disc, a digital versatile disc (DVD), and a Blu-ray disc. The disks usually reproduce data magnetically, and the discs reproduce data optically through lasers. Combinations of the foregoing items should also be included in the scope of the computer-readable medium.

An instruction may be executed by one or more processors such as one or more digital signal processors (DSP), general-purpose microprocessors, application-specific integrated circuits (ASIC), field programmable gate arrays (FPGA), or other equivalent integrated or discrete logic circuits. Therefore, the term "processor" used in this specification may refer to the foregoing structure or any other structure suitable for implementing technologies described in this specification. In addition, in some aspects, the functions described with reference to the illustrative logical blocks, modules, and steps described in this specification may be provided in dedicated hardware and/or software modules configured for encoding and decoding, or may be integrated into a combined codec. In addition, the technologies may be completely implemented in one or more circuits or logic elements.

Technologies of this application may be implemented in various apparatuses or devices, including a wireless handset, an integrated circuit (IC), or a set of ICs (for example, a chip set). Various components, modules, or units are described in this application to emphasize functional aspects of apparatuses configured to perform disclosed technologies, but do not necessarily need to be implemented by different hardware units. Actually, as described above, various units may be combined into a codec hardware unit in combination with appropriate software and/or firmware, or may be provided by interoperable hardware units (including the one or more processors described above).

The terms used in the foregoing embodiments are merely intended to describe specific embodiments, but are not intended to limit this application. The terms "one", "a", and "this" of singular forms used in this specification and the appended claims of this application are also intended to include expressions such as "one or more", unless otherwise specified in the context clearly. It should be further understood that, in the following embodiments of this application, "at least one" and "one or more" mean one, two, or more. The term "and/or" is used to describe an association relationship between associated objects and represents that three relationships may exist. For example, A and/or B may represent the following cases: Only A exists, both A and B exist, and only B exists, where A and B each may be singular or plural. The character "/" usually indicates an "or" relationship between the associated objects.

Reference to "an embodiment", "some embodiments", or the like described in this specification indicates that one or more embodiments of this application include a specific feature, structure, or characteristic described with reference to the embodiment. Therefore, statements such as "in an embodiment", "in some embodiments", "in some other embodiments", and "in other embodiments" that appear at different places in this specification do not necessarily mean referring to a same embodiment, but mean "one or more but not all of embodiments", unless otherwise specifically emphasized in another manner. The terms "include", "comprise", "have", and their variants all mean "include but are not limited to", unless otherwise specifically emphasized in another manner.

The foregoing descriptions are merely example specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, wherein the method comprises:
obtaining, by a first network device, timestamps and packet lengths of a plurality of data packets;
determining, by the first network device, an arrival time interval of each of the plurality of data packets based on the timestamps of the plurality of data packets, wherein arrival time intervals of the plurality of data packets constitute a time interval sequence according to an arrival order, and the plurality of data packets are in a data stream including a video service or a cloud virtual reality service;
determining, by the first network device, time domain feature parameters of the plurality of data packets, wherein the time domain feature parameters are model parameters of a Markovian arrival process (MAP) model obtained when a likelihood function of the time interval sequence is a maximum value;
determining, by the first network device, packet length feature parameters based on the packet lengths of the plurality of data packets that have arrived, wherein the packet length feature parameters and the time domain feature parameters are used to predict service level agreement (SLA) performance of the plurality of data packets
sending, by the first network device to a second network device, signaling that carries the time domain feature parameters and the packet length feature parameters; and
determining, by the first network device and based on the time domain feature parameters, the packet length feature parameters, and network bandwidth, a first cumulative probability value indicating a probability that latencies of the plurality of data packets are less than a target latency, wherein when the first cumulative probability value is greater than a first preset threshold, the latencies of the plurality of data packets meet an SLA requirement.

2. The method according to claim 1, wherein the likelihood function of the time interval sequence is as follows:

$$L(D_0, D_1 | Z) = \varphi\left(\prod_{i=1}^{N-1} \exp(D_0 z_i) D_1\right) \exp(D_0 z_N)(D_1 \underline{1});$$

and $\begin{cases} \varphi(D_0 + D_1) = 0 \\ \varphi\underline{1} = 1 \end{cases}$, wherein
$D_0$ and $D_1$ are the model parameters, Z is the time interval sequence, $Z=(z_1, z_2, \ldots, z_N)$, $z_i$ indicates an arrival time interval of an $(i+1)^{th}$ data packet that has arrived, and $\underline{1}$ indicates an all-1 column vector.

3. The method according to claim 2, wherein the SLA performance comprises a latency, and
wherein the second network device determines, based on the time domain feature parameters, the packet length feature parameters, and network bandwidth, a first cumulative probability value indicating a probability that latencies of the plurality of data packets are less than a target latency, and wherein when the first cumulative probability value is greater than a first preset threshold, the latencies of the plurality of data packets meet an SLA requirement.

4. The method according to claim 3, wherein a cumulative probability distribution function $F_T(x)$ of the latency T of the plurality of data packets is as follows:

$$F_T(x) = Pr[T \le x] = 1 - \frac{1}{\lambda_p}\sum_{l=0}^{\infty} \pi_l D_1 t_l(x),$$

wherein
l is an integer, $\lambda_p = \varphi D_1 \underline{1}$, $\pi Q = \underline{0}$, $\pi = [\pi_0, \pi_1, \ldots, \pi_l, \ldots]$, and $\pi \underline{1} = 1$;

$$Q = \begin{bmatrix} D_0 & D_1 & 0 & 0 & \ldots \\ \mu_p I & D_0 - \mu_p I & D_1 & 0 & \ldots \\ 0 & \mu_p I & D_0 - \mu_p I & D_1 & \ldots \\ 0 & 0 & \mu_p I & D_0 - \mu_p I & \ldots \\ \vdots & \vdots & \vdots & \vdots & \vdots \end{bmatrix},$$

$\underline{0}$ indicates an all-0 row vector, I indicates a unit matrix, $\mu_p$ indicates a packet forwarding rate, $\mu_p = \mu/L$, L indicates the packet length feature parameters, and $\mu$ indicates the network bandwidth;

$t_l(x)$ indicates an auxiliary function, $t(x)=[t_0(x)^T, t_1(x)^T, \ldots, t_l(x)^T, \ldots]^T$, and $$\frac{d}{dx}t(x) = B \cdot t(x);$$

$$B = \begin{bmatrix} D_0 - \mu_p I & D_1 & 0 & 0 & \ldots \\ \mu_p I & D_0 - \mu_p I & D_1 & 0 & \ldots \\ 0 & \mu_p I & D_0 - \mu_p I & D_1 & \ldots \\ 0 & 0 & \mu_p I & D_0 - \mu_p I & \ldots \\ \vdots & \vdots & \vdots & \vdots & \vdots \end{bmatrix},$$

and O indicates an all-0 matrix; and
the cumulative probability distribution function $F_T(x)$ is used to calculate the first cumulative probability value.

5. The method according to claim 3, wherein the method further comprises:
controlling, by the first network device, network planning when the first cumulative probability value is less than the first preset threshold.

6. The method according to claim 2, wherein the method further comprises:
generating, by the first network device, a time interval sequence of a plurality of simulated data packets based on the MAP model and the time domain feature parameters;
generating, by the first network device, a packet length sequence of the plurality of simulated data packets based on the packet length feature parameters;
obtaining, by the first network device, a timestamp and a packet length of each of the plurality of simulated data packets based on the time interval sequence of the plurality of simulated data packets and the packet length sequence of the plurality of simulated data packets; and
performing, by the first network device, an SLA performance test on the plurality of simulated data packets based on timestamps and packet lengths of the plurality of simulated data packets, wherein an SLA performance test result of the plurality of simulated data packets is an SLA performance prediction result of the plurality of data packets.

7. The method according to claim 6, wherein the obtaining, by the first network device, a timestamp and a packet length of each of the plurality of simulated data packets based on the time interval sequence of the plurality of simulated data packets and the packet length sequence of the plurality of simulated data packets comprises:
determining, by the first network device, that a timestamp of a $(j+1)^{th}$ simulated data packet is a cumulative value of first j time intervals in the time interval sequence of the plurality of simulated data packets, wherein j is a positive integer not greater than a total quantity of the plurality of simulated data packets; and
determining, by the first network device, that a packet length of a $j^{th}$ simulated data packet is a $j^{th}$ packet length in the packet length sequence of the plurality of simulated data packets.

8. The method according to claim 6, wherein the performing, by the first network device, an SLA performance test on the plurality of simulated data packets based on timestamps and packet lengths of the plurality of simulated data packets comprises:
determining, by the first network device and based on the timestamps and the packet lengths of the plurality of simulated data packets, a first cumulative probability value indicating a probability that latencies of the plurality of simulated data packets are less than a target latency, wherein when the first cumulative probability value is greater than a first preset threshold, latencies of the plurality of data packets meet an SLA requirement.

9. The method according to claim 2, wherein the SLA performance comprises a cache queue length, and the method further comprises:
determining, by the first network device and based on the time domain feature parameters, the packet length feature parameters, and network bandwidth, a second cumulative probability value indicating a probability that cache queue lengths of the plurality of data packets are less than a target length, wherein when the second cumulative probability value is greater than a second preset threshold, the cache queue lengths of the plurality of data packets meet an SLA requirement.

10. The method according to claim 9, wherein a cumulative probability distribution function $F_A(y)$ of the cache queue length A is as follows:

$F_A(y)=Pr[A \leq y]=\Sigma_{l=0}^y \pi_l$, wherein l is an integer, $\pi Q = \underline{0}$, $\pi = [\pi_0, \pi_1, \ldots, \pi_l, \ldots]$, and $\pi \underline{1} = 1$;

$$Q = \begin{bmatrix} D_0 & D_1 & 0 & 0 & \ldots \\ \mu_p I & D_0 - \mu_p I & D_1 & 0 & \ldots \\ 0 & \mu_p I & D_0 - \mu_p I & D_1 & \ldots \\ 0 & 0 & \mu_p I & D_0 - \mu_p I & \ldots \\ \vdots & \vdots & \vdots & \vdots & \vdots \end{bmatrix},$$

$\underline{0}$ indicates an all-0 row vector, I indicates a unit matrix, μp indicates a packet forwarding rate, $\mu_p = \mu/L$, L indicates the packet length feature parameters, and μ indicates the network bandwidth; and
$F_A(y)$ is used to calculate the second cumulative probability value.

11. The method according to claim 1, wherein the plurality of data packets are in one of the following cases:
data packets of user equipment that are specific to a target service; or
data packets that are specific to a target service and that are received from a plurality of user equipments.

12. A method, wherein the method comprises:
receiving, by a second network device, data streams from K first network devices, respectively, to obtain a raw data stream, wherein K is a positive integer;
receiving, by the second network device, time domain feature parameters and packet length feature parameters from the K first network devices, respectively, wherein a time domain feature parameter of a first network device is determined by the first network device to be a model parameter of a Markovian arrival process (MAP) model obtained when a likelihood function of the time interval sequence is a maximum value, the time interval sequence comprises arrival time intervals, arranged according to an arrival order, of a plurality of data packets sent by the first network device, the plurality of data packets are in a data stream including a video service or a cloud virtual reality service, and the packet length feature parameter of the first network device is determined based on packet lengths of the plurality of the data packets; and
predicting, by the second network device, service level agreement (SLA) performance of the raw data stream based on a time domain feature parameter of the raw data stream and a packet length feature parameter of the raw data stream, wherein the time domain feature parameter of the raw data stream is determined based on the time domain feature parameters received by the second network device, and the packet length feature parameter of the raw data stream is determined based on the packet length feature parameters received by the second network device.

13. The method according to claim 12, wherein K=1, the time domain feature parameter of the raw data stream is the time domain feature parameter of the first network device, and the packet length feature parameter of the raw data stream is the packet length feature parameter of the first network device.

14. The method according to claim 12, wherein K is greater than 1, the time domain feature parameter of the raw data stream is a Kronecker sum of the received time domain feature parameters, and the packet length feature parameter of the raw data stream is a largest packet length feature parameter of the received packet length feature parameters.

15. An electronic device, comprising
one or more processors; and
a non-transitory computer-readable memory storing a program to be executed by the one or more processors, the program including instructions that, when executed by the one or more processors, cause the electronic device to:
obtain timestamps and packet lengths of a plurality of data packets;
determine an arrival time interval of each of the plurality of data packets based on the timestamps of the plurality of data packets, wherein arrival time intervals of the plurality of data packets constitute a time interval sequence according to an arrival order, and the plurality of data packets are in a data stream including a cloud virtual reality service;
determine time domain feature parameters of the plurality of data packets, wherein the time domain feature parameters are model parameters of a Markovian arrival process (MAP) model obtained when a likelihood function of the time interval sequence is a maximum value; and
determine packet length feature parameters based on the packet lengths of the plurality of data packets that have arrived, wherein the packet length feature parameters and the time domain feature parameters are used to predict service level agreement (SLA) performance of the plurality of data packets.

16. The electronic device according to claim 15, wherein the likelihood function of the time interval sequence is as follows:

$$L(D_0, D_1 \mid Z) = \varphi\left(\prod_{i=1}^{N-1} \exp(D_0 z_i) D_1\right) \exp(D_0 z_N)(D_1 \underline{1});$$

$$\text{and } \begin{cases} \varphi(D_0 + D_1) = 0 \\ \varphi\underline{1} = 1 \end{cases},$$

wherein
$D_0$ and $D_1$ are the model parameters, Z is the time interval sequence, $Z=(z_1, z_2, \ldots, z_N)$, $z_i$ indicates an arrival time interval of an $(i+1)^{th}$ data packet that has arrived, and $\underline{1}$ indicates an all-1 column vector.

17. The electronic device according to claim 16, wherein the SLA performance comprises a latency, and the instructions, when executed by the one or more processors, cause the electronic device to perform:

sending, by the electronic device to a second network device, signaling that carries the time domain feature parameters and the packet length feature parameters, wherein the second network device determines, based on the time domain feature parameters, the packet length feature parameters, and network bandwidth, a first cumulative probability value indicating a probability that latencies of the plurality of data packets are less than a target latency, and wherein when the first cumulative probability value is greater than a first preset threshold, the latencies of the plurality of data packets meet an SLA requirement.

18. The electronic device according to claim 17, wherein a cumulative probability distribution function $F_T(x)$ of the latency T of the plurality of data packets is as follows:

$$F_T(x) = Pr[T \le x] = 1 - \frac{1}{\lambda_p} \sum_{l=0}^{\infty} \pi_l D_1 t_l(x),$$

where
l is an integer, $\lambda_p = \varphi D_1 \underline{1}$, $\pi Q = \underline{0}$, $\pi = [\pi_0, \pi_1, \ldots, \pi_l, \ldots]$, and $\pi \underline{1} = 1$;

$$Q = \begin{bmatrix} D_0 & D_1 & 0 & 0 & \ldots \\ \mu_p I & D_0 - \mu_p I & D_1 & 0 & \ldots \\ 0 & \mu_p I & D_0 - \mu_p I & D_1 & \ldots \\ 0 & 0 & \mu_p I & D_0 - \mu_p I & \ldots \\ \vdots & \vdots & \vdots & \vdots & \vdots \end{bmatrix},$$

$\underline{0}$ indicates an all-0 row vector, I indicates a unit matrix, $\mu_p$ indicates a packet forwarding rate, $\mu p = \mu/L$, L indicates the packet length feature parameters, and $\mu$ indicates the network bandwidth;
$t_l(x)$ indicates an auxiliary function, $t(x) = [t_0(x)^T, t_1(x)^T, \ldots, t_l(x)^T, \ldots]^T$, and $$\frac{d}{dx} t(x) = B \cdot t(x);$$

$$B = \begin{bmatrix} D_0 - \mu_p I & D_1 & 0 & 0 & \ldots \\ \mu_p I & D_0 - \mu_p I & D_1 & 0 & \ldots \\ 0 & \mu_p I & D_0 - \mu_p I & D_1 & \ldots \\ 0 & 0 & \mu_p I & D_0 - \mu_p I & \ldots \\ \vdots & \vdots & \vdots & \vdots & \vdots \end{bmatrix},$$

and O indicates an all-0 matrix; and
the cumulative probability distribution function $F_T(x)$ is used to calculate the first cumulative probability value.

19. The electronic device according to claim 16, wherein the SLA performance comprises a latency, and the instructions, when executed by the one or more processors, cause the electronic device to perform:
determining, by the electronic device and based on the time domain feature parameters, the packet length feature parameters, and network bandwidth, a first cumulative probability value indicating a probability that latencies of the plurality of data packets are less than a target latency, wherein when the first cumulative probability value is greater than a first preset threshold, the latencies of the plurality of data packets meet an SLA requirement.

* * * * *